United States Patent
Murray et al.

(10) Patent No.: US 8,939,829 B2
(45) Date of Patent: Jan. 27, 2015

(54) COMBINE LINEAR SIDE-SHAKE CLEANING CONTROL SYSTEM

(71) Applicant: CNH America LLC, New Holland, PA (US)

(72) Inventors: Craig E. Murray, Davenport, IA (US); Tyler L. Nelson, Rochester, MN (US)

(73) Assignee: CNH Industrial America LLC, New Holland, PA (US)

( * ) Notice: Subject to any disclaimer, the term of this patent is extended or adjusted under 35 U.S.C. 154(b) by 14 days.

(21) Appl. No.: 13/715,251

(22) Filed: Dec. 14, 2012

(65) Prior Publication Data

US 2014/0171163 A1 Jun. 19, 2014

(51) Int. Cl.
*A01F 12/32* (2006.01)
*B07B 1/00* (2006.01)
*A01F 12/44* (2006.01)

(52) U.S. Cl.
CPC .................................. *A01F 12/448* (2013.01)
USPC ........................................................ 460/101

(58) Field of Classification Search
USPC ......... 460/101, 9, 10, 1; 296/190.07; 209/416
See application file for complete search history.

(56) References Cited

U.S. PATENT DOCUMENTS

| | | | |
|---|---|---|---|
| 86,942 A | 2/1869 | Robinson | |
| 853,061 A | 5/1907 | Case | |
| 2,123,876 A | 7/1938 | Berry et al. | |
| 2,189,706 A | 2/1940 | Clipston | |
| 2,893,558 A * | 7/1959 | Zollinger | 209/254 |
| 4,259,829 A | 4/1981 | Strubbe | |
| 4,332,127 A | 6/1982 | Staiert et al. | |
| 4,355,647 A | 10/1982 | Heidjann et al. | |
| 4,598,718 A * | 7/1986 | Glaubitz et al. | 460/9 |
| 4,736,753 A | 4/1988 | Glaubitz et al. | |
| 4,897,071 A * | 1/1990 | Desnijder et al. | 460/10 |
| 6,117,006 A | 9/2000 | Hofer et al. | |
| 6,579,172 B2 * | 6/2003 | Lauer | 460/101 |
| 7,322,882 B2 | 1/2008 | Duquesne et al. | |
| 7,927,199 B2 | 4/2011 | Adamson et al. | |

(Continued)

FOREIGN PATENT DOCUMENTS

| | | |
|---|---|---|
| DE | 6905754 | 5/1969 |
| EP | 1609352 | 12/2005 |
| GB | 2146218 | 4/1985 |

OTHER PUBLICATIONS

International Search Report dated Jun. 6, 2014 received in International Application No. PCT/US2013/075174.

*Primary Examiner* — Árpád Fábián-Kovács
(74) *Attorney, Agent, or Firm* — Patrick M. Sheldrake; Seyed V. Sharifi T.

(57) ABSTRACT

A combine side-shaking control system includes a sieve for separating crop material from other materials and configured to move in a fore-aft direction. At least one side-shaking assembly includes a mounting device attached to a combine chassis, a lower plate configured to rotate about a lower plate axis and an upper plate configured to (i) have an upper plate rotational motion and rotate responsive to the rotation of the lower plate and (ii) have an upper plate substantially linear motion in a substantially linear direction. A fixed arm is rotatably coupled to the upper plate and attached to the sieve. An actuation device is configured to rotate the lower plate about the lower plate axis. Responsive to the rotation of the upper plate, the sieve is controlled to move diagonal to the fore-aft direction in the substantially linear direction of the upper plate substantially linear motion.

15 Claims, 18 Drawing Sheets

(56) References Cited

U.S. PATENT DOCUMENTS 8,608,234 B2 * 12/2013 Haeusler et al. ......... 296/190.07
8,622,792 B1 * 1/2014 Murray ........................ 460/101
2006/0229119 A1 * 10/2006 Wamhof et al. ............... 460/101
2006/0249219 A1 * 11/2006 Vanderjeugt et al. ........... 139/87

* cited by examiner

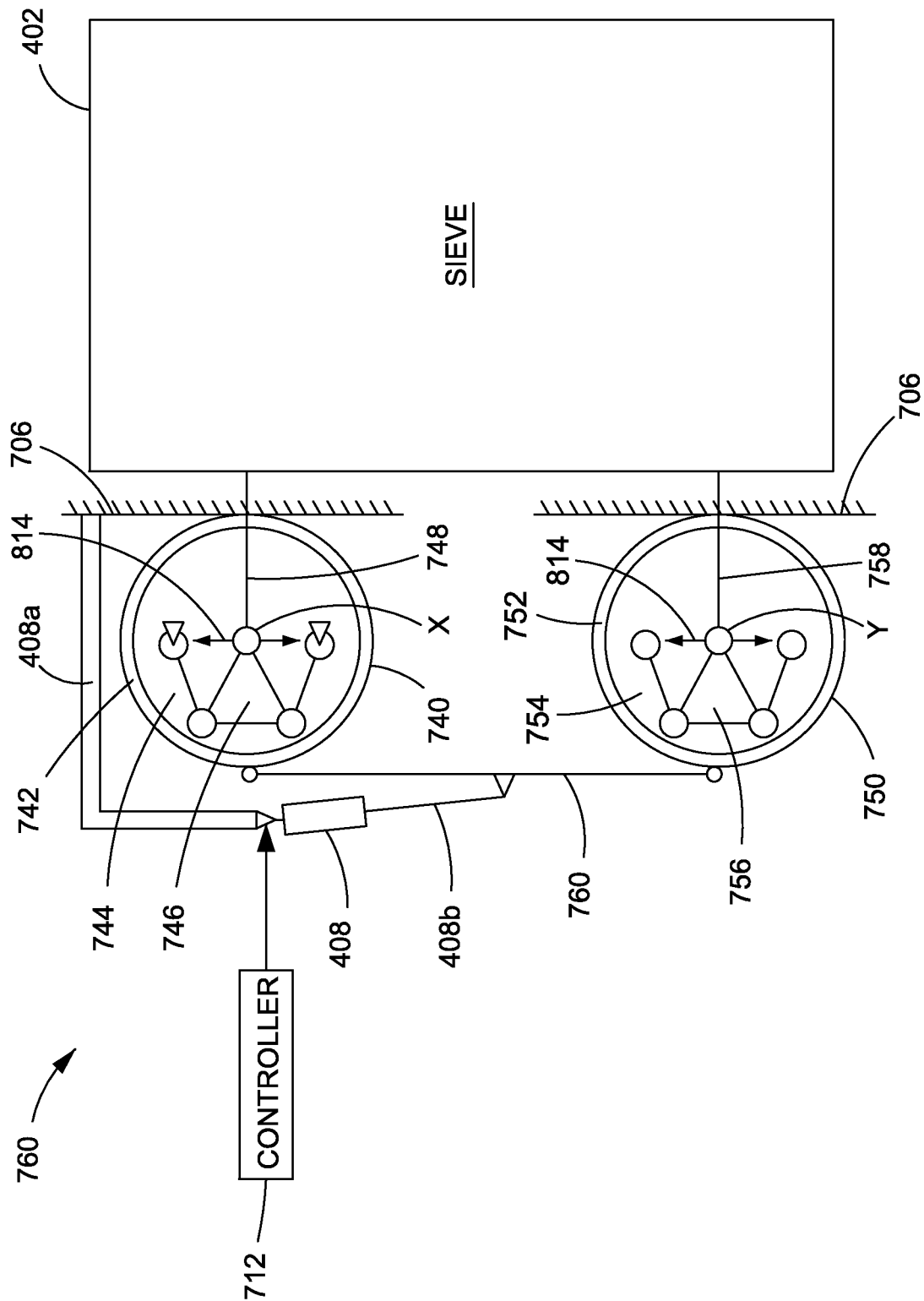

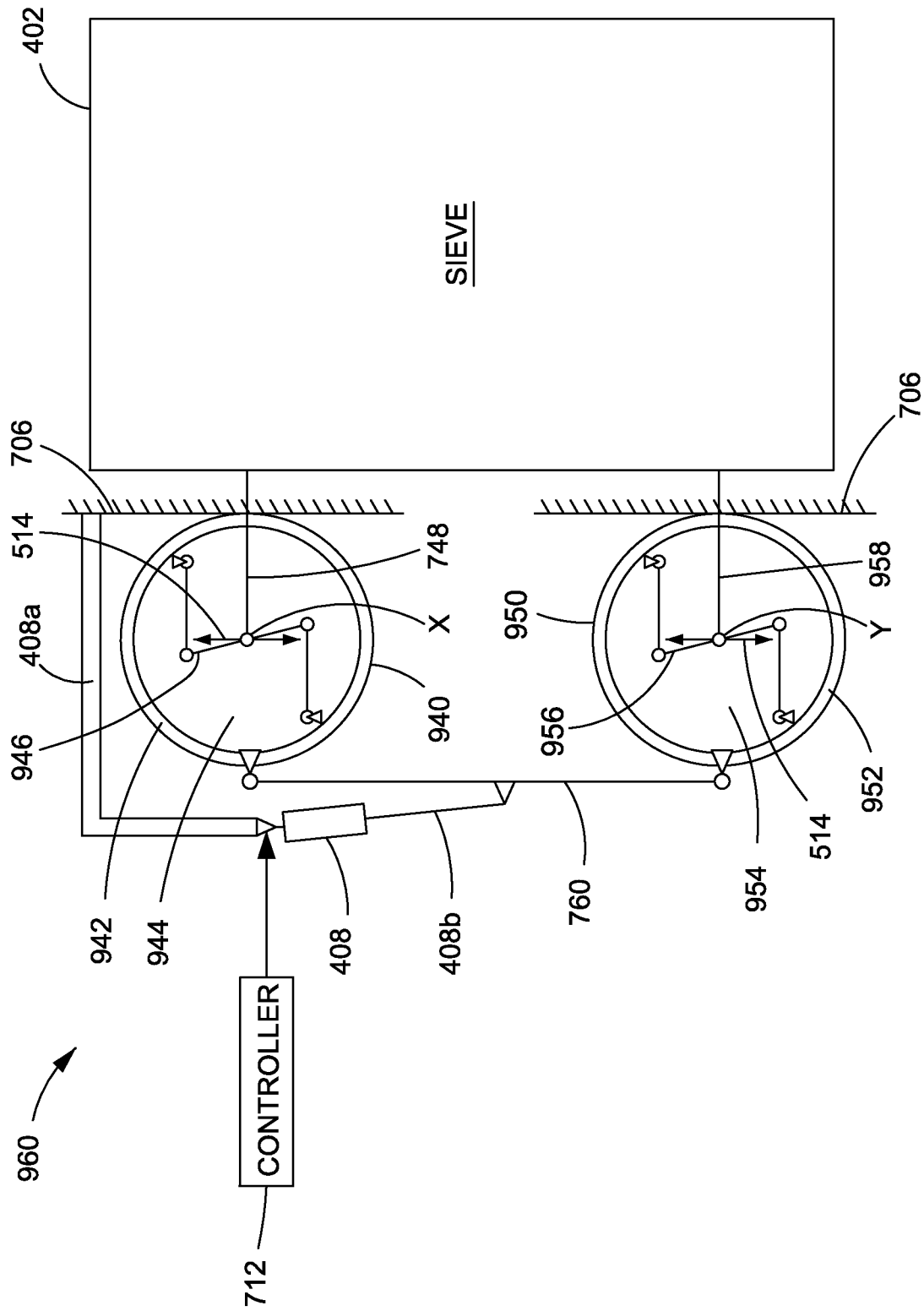

COMBINE LINEAR SIDE-SHAKE CLEANING CONTROL SYSTEM

TECHNOLOGY FIELD

The present invention relates generally to a control system for a side-shake cleaning mechanism for use with a harvester, such as a combine harvester, and more particularly to methods and systems to control the movement of a side-shake cleaning mechanism in a combine harvester.

BACKGROUND

A combine harvester is a machine that is used to harvest grain crops. The objective is to complete several processes, which traditionally were distinct, in one pass of the machine over a particular part of the field. Among the crops that may be harvested with a combine are wheat, oats, rye, barley, corn, soybeans, flax or linseed, and others. The waste (e.g., straw) discharged on the field includes the remaining dried stems and leaves of the crop which may be, for example, chopped and spread on the field as residue or baled for feed and bedding for livestock.

A combine harvester cuts crop using a wide cutting header. The cut crop may be picked up and fed into the threshing and separating mechanism of the combine, typically consisting of a rotating threshing rotor or cylinder to which grooved steel bars commonly referred to as rasp bars or threshing elements may be bolted. These rasp bars thresh and aid in separating the grains from the chaff and straw through the action of the drum against the concaves, i.e., shaped "half drum," that may also be fitted with steel bars and a meshed grill, through which grain, chaff and smaller debris may fall, whereas the straw, being too big or long, is carried through to the outlet. The chaff, straw, and other undesired material are returned to the field via a spreader mechanism.

In an axial flow combine, this threshing and separating system serves a primary separation function. The harvested crop is threshed and separated as it is conveyed between a longitudinally arranged rotor and the inner surface of an associated chamber comprising threshing and separating concaves, and a rotor cage or cover. The cut crop material spirals and is conveyed along a helical path along the inner surface of the chamber until substantially only larger residue remains. When the residue reaches the end of the threshing drum, it is expelled out of the rear of the combine. Meanwhile, the grain, chaff, and other small debris fall through the concaves and grates onto a cleaning device or shoe. For ease of reference, this smaller particulate crop material that contains the grain and chaff is referred to as threshed crop. The grain still needs to be further separated from the chaff by way of a winnowing process.

Clean grain is separated out of the threshed crop by way of a flat oscillating cleaning system that can include a combination of oscillating screens (sieves), a fan which blows air through/above/beneath the sieves, and some mechanism which transports the material to be cleaned from beneath the threshing system to the sieves. Clean grain that is separated from residue via the sieves is typically transported to a grain tank in the combine for temporary storage. The grain tank is typically located atop the combine and loaded via a conveyer that carries clean grain collected in the cleaning system to the grain tank. The grain may then be unloaded through a conveying system to a support trailer or vehicle, allowing large quantities of grain to be unloaded in the field without needing to stop harvesting when the grain tank fills.

Presently, combines may be equipped with hillside compensation mechanisms for combine cleaning systems which provide compensation to the cleaning system when the combine experiences a change in inclination (i.e., harvesting on uneven terrain). Under flat ground operation, the cleaning system of a combine moves in 2-dimensional motion, shaking fore/aft with some vertical component. Conventional side-shaking mechanisms, do not affect any changes to the 2-dimensional (fore/aft/vertical) movement of the cleaning system on flat ground. On inclined ground, however, the side-shaking mechanisms introduce an additional side-to-side component in the shake geometry of a sieve, causing material to resist its natural tendency to migrate to the lower side of the sieve and remain more evenly distributed across the width of the sieve. These conventional side-shaking mechanisms are fixed to the combine chassis and do not move as the sieve moves fore/aft/vertical. Due to the difference in relative motion between the sieve and the side-shaking mechanisms, a series of linkages is employed to move the sieve in the side-to-side motion as the sieve moves fore/aft/vertical. Because the linkages pivot on the fixed chassis, however, the sieve moves in an arc motion (non-linear), reducing the efficiency of the side-shaking motion and requiring less desirable smaller sieves to account for the arc movement between the sieves and the side sheets which enclose the cleaning system.

U.S. Pat. No. 7,322,882, which is incorporated herein for its teachings on cleaning system compensation mechanisms, describes a grain cleaning side-shaking mechanism which addresses the arc movement via a linkage configuration, causing the sieve to move in a more desirable diagonal line. To compensate for the arc movement, the conventional linkage configuration requires an actuator (which moves the sieve in the side-to side-motion) to be attached to the sieve, which vibrates at a high rate with the sieve, resulting in undesirable stress. Therefore, a larger and more expensive actuator is required to perform the side-to-side movement and deal with the vibrational stress, taking up space in the cleaning system which could be used for more desirable larger sieves. Accordingly, what is needed is an improved side-shaking assembly for a combine cleaning system.

SUMMARY

Embodiments are directed to a combine side-shaking control system that includes a sieve for separating crop material from other materials and configured to move in a fore-aft direction. The control system also includes at least one side-shaking assembly that includes a mounting device rigidly attached to a combine chassis. The at least one side-shaking assembly includes a lower plate rotatably coupled to the mounting device and configured to rotate about a lower plate axis and an upper plate coupled to the lower plate and configured to (i) have an upper plate rotational motion and rotate responsive to the rotation of the lower plate and (ii) have an upper plate substantially linear motion in a substantially linear direction. The at least one side-shaking assembly also includes a fixed arm rotatably coupled to the upper plate and rigidly attached to the sieve. The control system further includes an actuation device (i) rigidly attached to the combine chassis, (ii) coupled to the lower plate and (iii) configured to rotate the lower plate about the lower plate axis. Responsive to the rotation of the upper plate, the sieve is controlled to move diagonal to the fore-aft direction in the substantially linear direction of the upper plate substantially linear motion.

According to an embodiment, the side-shaking control system further includes a first pivot arm (i) coupled to the lower plate at a first lower plate pivot portion and (ii) coupled to the upper pivot plate at a first upper plate pivot portion. The side-shaking control system further includes a second pivot arm (i) coupled to the lower plate at a second lower plate pivot portion spaced from the first lower plate pivot portion and (ii) coupled to the upper pivot plate at a second upper plate pivot portion spaced from the first upper plate pivot portion. The sieve is further controlled to move in the substantially linear direction of the upper plate substantially linear motion which is substantially parallel to a line extending between the first upper plate pivot portion and the second upper plate pivot portion.

According to another embodiment, the side-shaking control system further includes a first pivot arm (i) coupled to the lower plate at a first lower plate pivot portion and (ii) coupled to the upper pivot plate at a first upper plate pivot portion. The side-shaking control system further includes a second pivot arm (i) coupled to the lower plate at a second lower plate pivot portion spaced from the first lower plate pivot portion, (ii) coupled to the upper pivot plate at a second upper plate pivot portion spaced from the first upper plate pivot portion, and (iii) substantially parallel to the first pivot arm. The sieve is further controlled to move in the substantially linear direction of the upper plate substantially linear motion which is substantially perpendicular to the first pivot arm and the second pivot arm.

In one embodiment, the lower plate and the upper plate are configured to rotate between a non-engaging position and at least one engaging position and the upper plate is configured to (i) have a non-engaging motion in a non-engaging substantially linear direction and (ii) have an engaging motion in an engaging substantially linear direction different from the non-engaging substantially linear direction. The sieve is controlled to (i) remain stationary or move in the fore-aft direction when the lower plate and the upper plate are in the non-engaging position, and (ii) move diagonal to the fore-aft direction in the engaging substantially linear direction of the upper plate substantially linear motion when the lower plate and the upper plate are in the at least one engaging position.

In an aspect of an embodiment, the at least one engaging position further includes a first engaging position and a second engaging position, the lower plate and the upper plate are further configured to (i) rotate to the first engaging position and (ii) rotate to the second engaging position and the upper plate is configured to (i) have a first engaging motion in a first engaging substantially linear direction and (ii) have an second engaging motion in a second engaging substantially linear direction different from the first engaging substantially linear direction. The sieve is controlled to (i) move diagonal to the fore-aft direction in the first engaging substantially linear direction of the upper plate motion when the lower plate and the upper plate are in the first engaging position and (ii) move diagonal to the fore-aft direction in the second engaging substantially linear direction of the upper plate motion when the lower plate and the upper plate are in the second engaging position.

According to one embodiment, the actuation device is selected from a group of actuation devices that include an electric actuator, a hydraulic actuator, a pneumatic actuator and a motor.

According to one embodiment, the at least one side-shaking assembly further includes a first side-shaking assembly and a second side-shaking assembly. The first side-shaking assembly includes a first mounting device rigidly coupled to the combine chassis, a first lower plate rotatably coupled to the first mounting device and configured to rotate about a first lower plate axis, a first upper plate coupled to the first lower plate and configured to (i) rotate responsive to the rotation of the first lower plate and (ii) configured to have first upper plate substantially linear motion in the substantially linear direction and a first fixed arm coupled between the first upper plate and the sieve. The second side-shaking assembly includes a second mounting device rigidly coupled to the combine chassis, a second lower plate rotatably coupled to the second mounting device and configured to rotate about a second lower plate axis, a second upper plate coupled to the second lower plate and configured to (i) rotate responsive to the rotation of the second lower plate and (ii) configured to have second upper plate substantially linear motion in the substantially linear direction and a second fixed arm coupled between the second upper plate and the sieve.

In an aspect of an embodiment, the side-shaking control system further includes a moving device (i) coupled to the first lower plate, the second lower plate and the actuation device and (ii) configured to rotate the first lower plate and the second lower plate. The actuation device is configured to rotate the first lower plate and the second lower plate by moving the moving device.

Embodiments are directed to a combine that includes a sieve for separating crop material from other materials and configured to move in a fore-aft direction and at least one side-shaking assembly. The at least one side-shaking assembly includes a mounting device rigidly attached to a combine chassis and a lower plate rotatably coupled to the mounting device and configured to rotate about a lower plate axis. The at least one side-shaking assembly also includes an upper plate coupled to the lower plate and configured to (i) have an upper plate rotational motion and rotate responsive to the rotation of the lower plate and (ii) have an upper plate substantially linear motion in a substantially linear direction and a fixed arm rotatable coupled to the upper plate and rigidly attached to the sieve. The combine also includes an actuation device (i) rigidly attached to the combine chassis, (ii) coupled to the lower plate and (iii) configured to rotate the lower plate about the lower plate axis. The combine further includes a controller configured to control the sieve to (i) move in the fore-aft direction or (ii) move diagonal to the fore-aft direction in the substantially linear direction of the substantially linear upper plate motion.

According to an embodiment, the combine further includes a first pivot arm (i) coupled to the lower plate at a first lower plate pivot portion and (ii) coupled to the upper pivot plate at a first upper plate pivot portion. The combine further includes a second pivot arm (i) coupled to the lower plate at a second lower plate pivot portion spaced from the first lower plate pivot portion and (ii) coupled to the upper pivot plate at a second upper plate pivot portion spaced from the first upper plate pivot portion. The sieve is further controlled to move in the substantially linear direction of the upper plate substantially linear motion which is substantially parallel to a line extending between the first upper plate pivot portion and the second upper plate pivot portion.

According to an embodiment, the combine further includes a first pivot arm (i) coupled to the lower plate at a first lower plate pivot portion and (ii) coupled to the upper pivot plate at a first upper plate pivot portion. The combine further includes a second pivot arm (i) coupled to the lower plate at a second lower plate pivot portion spaced from the first lower plate pivot portion, (ii) coupled to the upper pivot plate at a second upper plate pivot portion spaced from the first upper plate pivot portion, and (iii) substantially parallel to the first pivot arm. The sieve is further controlled to move in the substantially linear direction of the upper plate substantially linear motion which is substantially perpendicular to the first pivot arm and the second pivot arm.

In one embodiment, the lower plate and the upper plate are configured to rotate between a non-engaging position and at least one engaging position and the upper plate is configured to (i) have a non-engaging motion in a non-engaging substantially linear direction and (ii) have an engaging motion in an engaging substantially linear direction different from the non-engaging substantially linear direction. The sieve is controlled to (i) remain stationary or move in the fore-aft direction when the lower plate and the upper plate are in the non-engaging position, and (ii) move diagonal to the fore-aft direction in the engaging substantially linear direction of the upper plate motion when the lower plate and the upper plate are in the at least one engaging position.

In another embodiment, the actuation device is from a group of actuation devices comprising an electric actuator, a hydraulic actuator, a pneumatic actuator and a motor.

According to one embodiment, the combine further includes a first side-shaking assembly and a second side-shaking assembly. The first side-shaking assembly includes a first mounting device rigidly coupled to the combine chassis, a first lower plate rotatably coupled to the first mounting device and configured to rotate about a first lower plate axis. The first side-shaking assembly also includes a first upper plate coupled to the first lower plate and configured to (i) rotate responsive to the rotation of the first lower plate and (ii) configured to have first upper plate substantially linear motion in the substantially linear direction. The first side-shaking assembly further includes a first fixed arm coupled between the first upper plate and the sieve. The second side-shaking assembly includes a second mounting device rigidly coupled to the combine chassis and a second lower plate rotatably coupled to the second mounting device and configured to rotate about a second lower plate axis. The second side-shaking assembly also includes a second upper plate coupled to the second lower plate and configured to (i) rotate responsive to the rotation of the second lower plate and (ii) configured to have second upper plate substantially linear motion in the substantially linear direction of the first upper plate motion. The second side-shaking assembly further includes a second fixed arm coupled between the second upper plate and the sieve.

In an aspect of an embodiment, the combine further includes a moving device (i) coupled to the first lower plate, the second lower plate and the actuation device and (ii) configured to rotate the first lower plate and the second lower plate. The controller is further configured to control the sieve to (i) move in the fore-aft direction or (ii) move diagonal to the fore-aft direction in the substantially linear direction of the first upper plate substantially linear motion and the second upper plate motion by controlling the actuation device to move the moving device which rotates the first lower plate and the second lower plate.

Embodiments are directed to a method for controlling movement of a sieve in a combine that includes causing, by an actuation device rigidly attached to the combine chassis, a lower plate to rotate about a lower plate axis and rotating an upper plate, having a an upper plate rotational motion and an upper plate substantially linear motion in a substantially linear direction, responsive to the rotation of the lower plate. The method also includes controlling a sieve to at least one of (i) maintain a stationary position; (ii) move in a fore-aft direction and (iii) move diagonal to the fore-aft direction in the substantially linear direction of the upper plate substantially linear motion using a fixed arm coupled between the upper plate and the sieve.

In one embodiment, the rotating the upper plate further includes rotating the upper plate with a first pivot arm (i) coupled to the lower plate at a first lower plate pivot portion and (ii) coupled to the upper pivot plate at a first upper plate pivot portion and rotating the upper plate with a second pivot arm (i) coupled to the lower plate at a second lower plate pivot portion spaced from the first lower plate pivot portion and (ii) coupled to the upper pivot plate at a second upper plate pivot portion spaced from the first upper plate pivot portion. Controlling the sieve to move diagonal to the fore-aft direction in the substantially linear direction of the upper plate substantially linear motion further includes controlling the sieve to move substantially parallel to a line extending between the first upper plate pivot portion and the second upper plate pivot portion.

In another embodiment, rotating the upper plate further includes rotating the upper plate with a first pivot arm (i) coupled to the lower plate at a first lower plate pivot portion and (ii) coupled to the upper pivot plate at a first upper plate pivot portion. Rotating the upper plate with a second pivot arm (i) coupled to the lower plate at a second lower plate pivot portion spaced from the first lower plate pivot portion, (ii) coupled to the upper pivot plate at a second upper plate pivot portion spaced from the first upper plate pivot portion, and (iii) substantially parallel to the first pivot arm. Controlling the sieve to move diagonal to the fore-aft direction in the substantially linear direction of the upper plate substantially linear motion further comprises controlling the sieve to move substantially perpendicular to the first pivot arm and the second pivot arm.

According to one embodiment, the method further includes rotating the lower plate and the upper plate between a non-engaging position and at least one engaging position; and controlling the sieve further includes (i) maintaining the sieve in a stationary position or moving the sieve in the fore-aft direction when the lower plate and the upper plate are in the non-engaging position; and (ii) moving the sieve diagonal to the fore-aft direction in an engaging substantially linear direction of the upper plate substantially linear motion when the lower plate and the upper plate are in the at least one engaging position.

According to another embodiment, the at least one engaging position further includes a first engaging position and a second engaging position. Rotating the lower plate and the upper plate in at least one engaging position further includes (i) rotating the lower plate and the upper plate to the first engaging position and (ii) rotating the lower plate and the upper plate to the second engaging position. Controlling the sieve further includes (i) moving the sieve diagonal to the fore-aft direction in a first engaging substantially linear direction of the upper plate motion when the lower plate and the upper plate are in the first engaging position; and (ii) moving the sieve diagonal to the fore-aft direction in a second engaging substantially linear direction of the upper plate motion when the lower plate and the upper plate are in the second engaging position.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 7E is a schematic diagram illustrating the sieve, actuation device and a pair of side-shaking assemblies having Robert's linkages for use with embodiments of the present invention;

FIG. 9E is a schematic diagram illustrating the sieve, actuation device and a pair of side-shaking assemblies having Watt's linkages for use with embodiments of the present invention.

DETAILED DESCRIPTION OF ILLUSTRATED EMBODIMENTS

Embodiments of the present invention utilize a side-shaking mechanism which includes moving portions so that the actuator may extend and retract without vibrating with the sieves. Embodiments of the present invention provide substantially linear diagonal movement of the sieves with a smaller, less expensive and easily mountable actuator coupled to the chassis which does not vibrate with the sieves, creating more space for larger, more efficient sieves. Embodiments of the present invention utilize a Watt's linkage configuration for converting rotational motion to substantially linear motion. Embodiments of the present invention utilize a Robert's linkage configuration for converting rotational motion to substantially linear motion.

Figure 1:
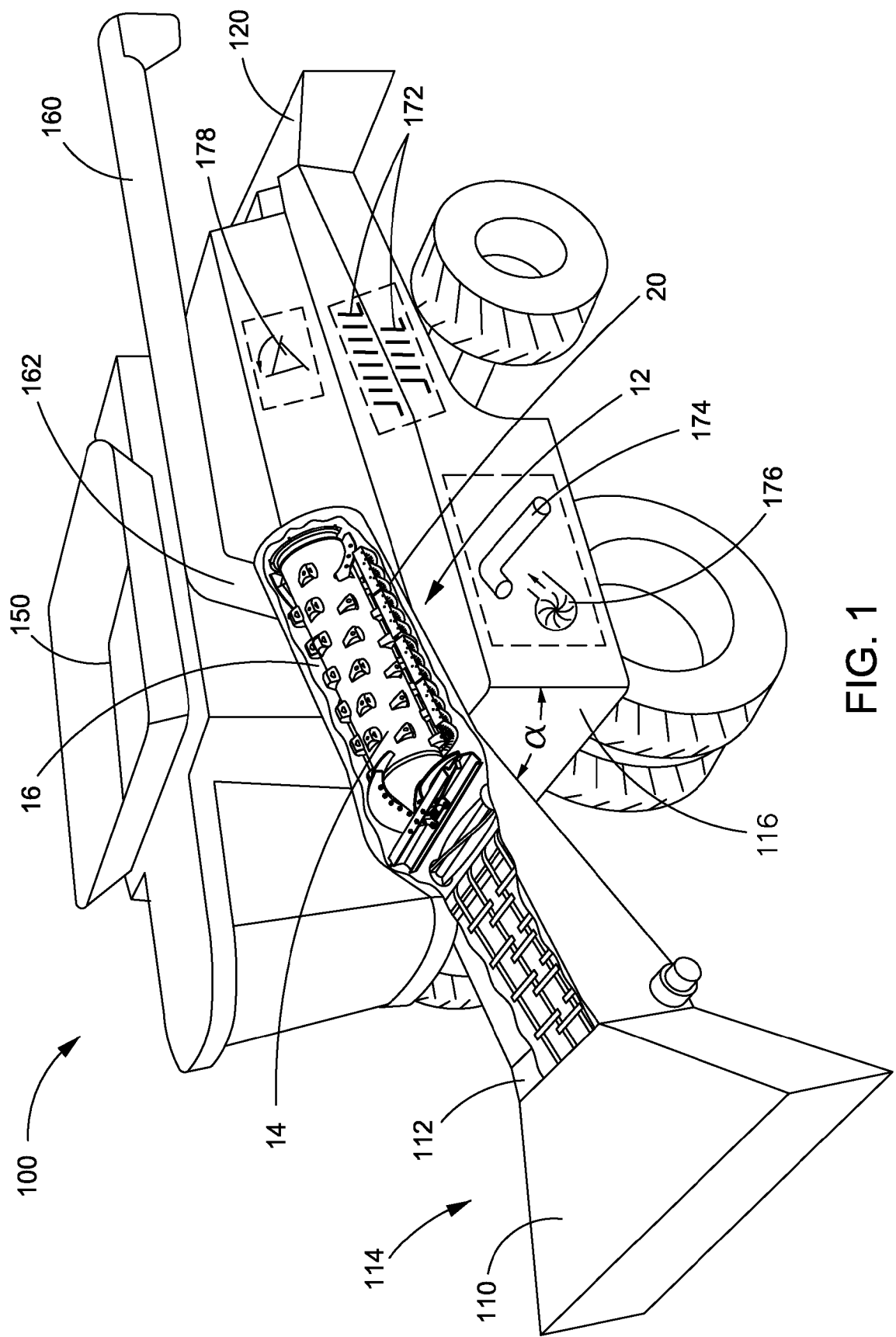
FIG. 1 is a perspective view of an exemplary combine for use with embodiments of the present invention.
Figure 2:
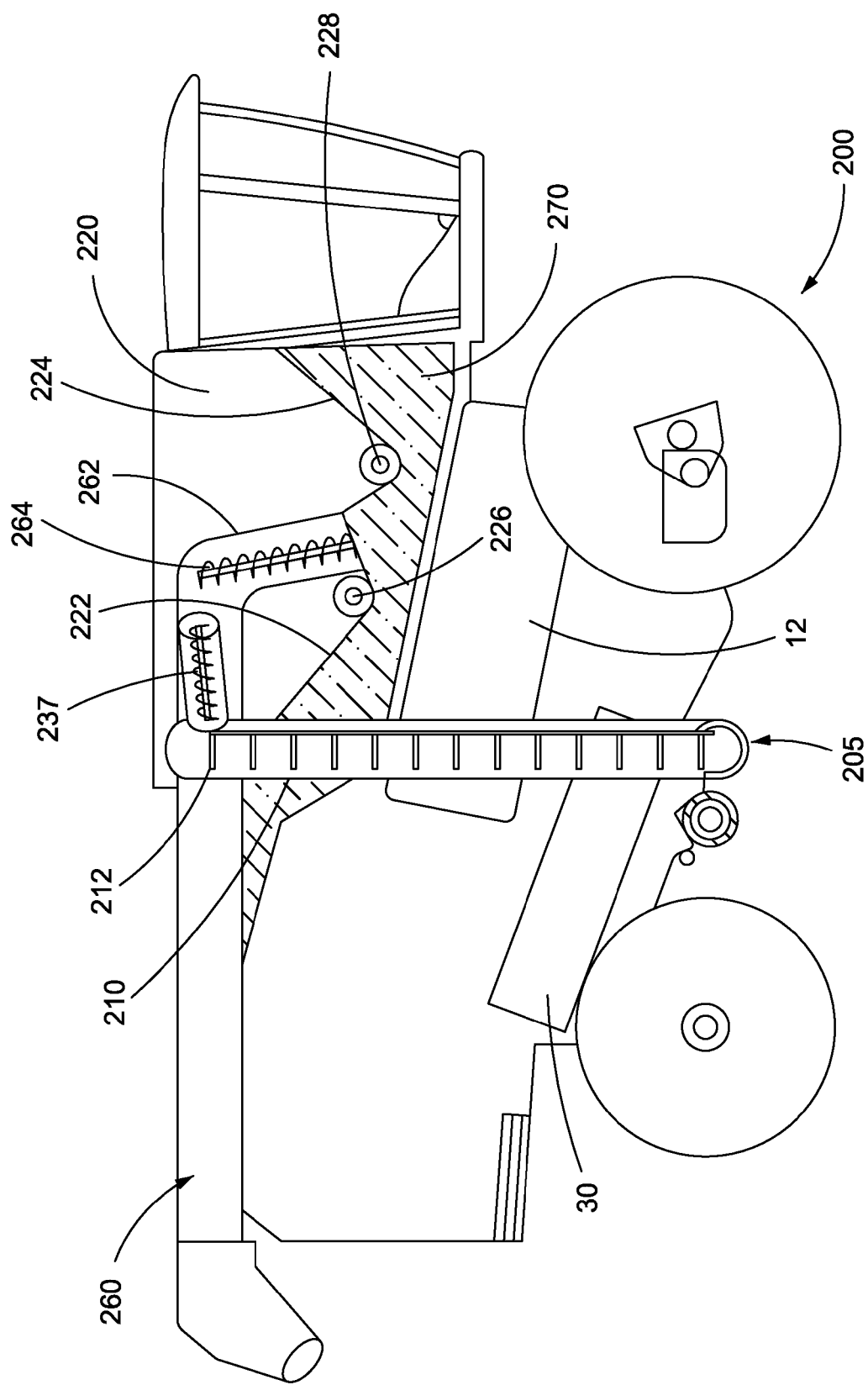
FIG. 2 is a side view of an exemplary combine for use with embodiments of the present invention.
Figure 3:
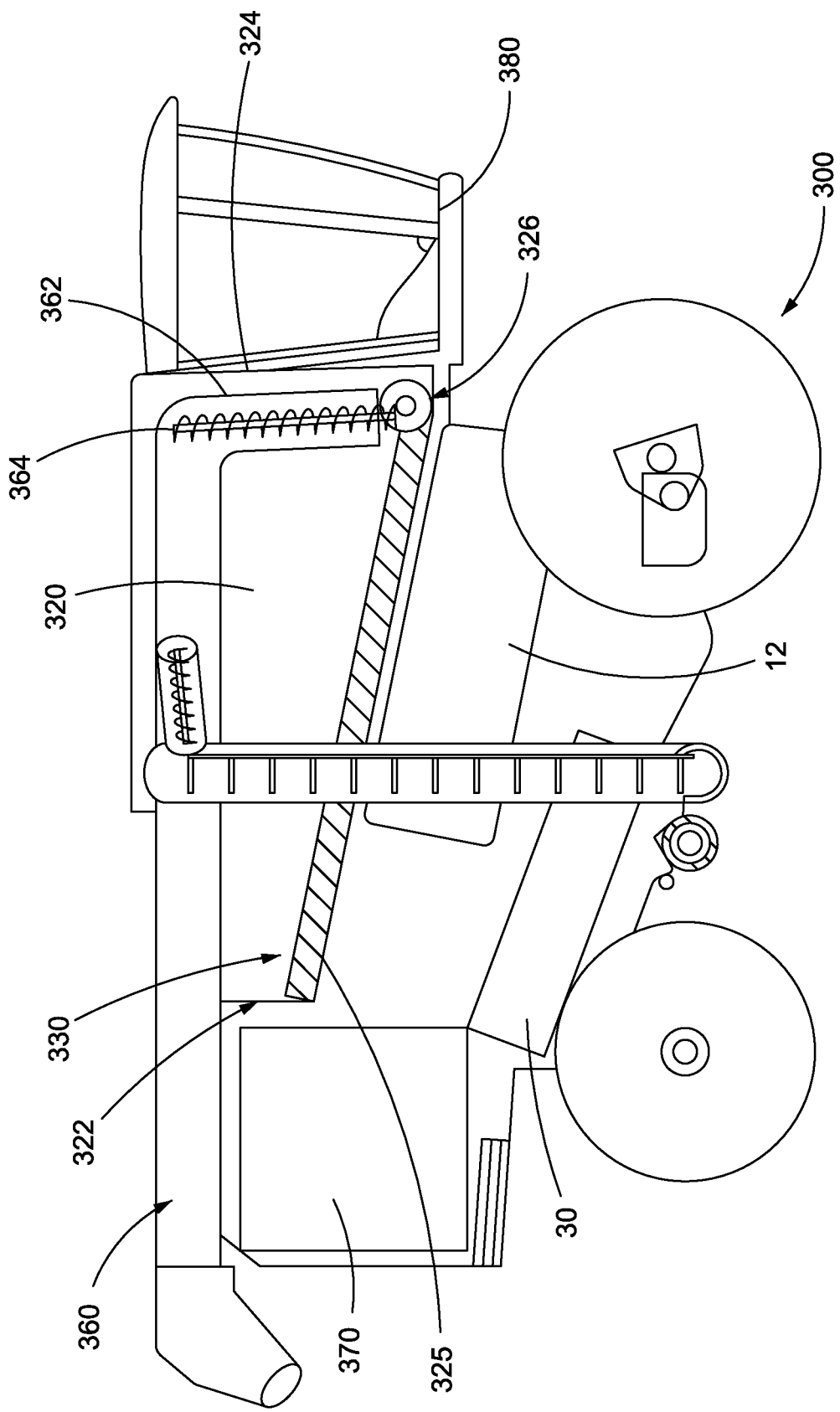
FIG. 3 is a side view of an exemplary combine for use with embodiments of the present invention.

FIG. 1 through FIG. 3 shows exemplary agricultural combines in which exemplary embodiments of the present invention may be implemented. FIG. 1 shows an exemplary agricultural combine 100, which may also be referred to as a combine or harvester throughout this specification. As shown in FIG. 1, the combine 100 may include a combine frame 116 and a feeding system 114, having a header 110 and a movable feeding mechanism 112. The movable feeding mechanism 112 may have a position which includes an angle α relative to a portion of the combine frame 116. Combine 100 may also include a longitudinally axially arranged threshing and separation system 12, and a concave 20 within the threshing and separation system 12. The threshing mechanism may also be of any well-known construction and operation. In some embodiments, the concave 20 may also be used with combines having transversely aligned threshing and separation system in a combine.

As shown, threshing and separation system 12 is axially arranged, in that it includes a cylindrical threshing rotor 14 conventionally supported and rotatable in a predetermined direction about a rotational axis therethrough for conveying a flow of crop material in a helical flow path through a threshing chamber 16 extend circumferentially around the rotor 14. As shown, concaves 20 may extend circumferentially around the rotor 14 and the flow of crop may pass in the space between the spinning rotor and the concaves. As the crop material flows through the threshing and separation system 12, the crop material including, for example, grain, straw, legumes, and the like, will be loosened and separated from crop residue or MOG (material other than grain) such as, for example, husks, cobs, pods, and the like, and the separated materials may be carried away from the threshing and separation system 12 in a well-known conventional manner. Crop residue can be redistributed to the field via a spreader 120, located at the back of the harvester.

The remaining threshed crop, which includes the grain to be collected, is then cleaned via a cleaning system. The cleaning system can include conventional winnowing mechanisms including a fan 176 that blows air across a series of reciprocating sieves 172. Through the winnowing action of the air and the reciprocating sieves 172, clean grain may be collected and sorted from the remaining chaff. Crop-handling systems, which include augers and elevators, may be used to transport cleaned crop, such as grain, to a grain tank 150 and from the grain tank 150 to a grain cart (not shown). Crop-handling systems may also transport tailings materials back to the cleaning system/threshing system through tailings elevator 174. The clean grain may be conveyed to the grain tank 150 via a cross auger that conveys grain laterally from the bottom of the cleaning system to a vertical conveyor (or elevator) that conveys grain up a load tube to be spilled into grain tank 150. At the bottom of grain tank 150, one or more grain tank augers (such as cross augers) move grain laterally from the bottom of the grain tank 150 to vertical tube 162 of unload tube 160, representing a turret style system of offloading. Vertical tube 162 may include a single unload conveying auger or multiple unload conveying augers, such as an auger for propelling grain up and to another auger within the unload tube 160. Unload tube 160 may be rotated such that it may extend its full length laterally for unloading grain from the grain tank 150 to a support vehicle, such as a truck that is driving along the side of the combine 100. Unload tube 160 may also be oriented to the rear for storage, as shown. In a swivel style offloading system (not shown), the vertical tube 162 and unload tube 160 is replaced by an unload conveying auger that is attached to the one or more cross augers conveying grain from the cleaning system and may pivot from side-to-side from the combine 100, conveying grain from the combine 100.

FIG. 2 shows a transparent cross-sectional view of another agricultural combine 200 in which exemplary embodiments of the present invention may be implemented. Combine 200 includes a grain tank 220 and a threshing system 12 for threshing crop, such as grain. The threshed crop is then cleaned via the cleaning system 30. The surface in cleaning system 30 separates out clean grain which collects along the path of the bottom of the cleaning system at cross auger 205. The cross auger 205 moves the clean grain laterally to an elevator 210, which includes a paddle chain lift 212. The paddle chain lift 212, wherein the paddles are uniformly spaced along the chain to lift grain, conveys the grain upward to a dispenser auger 237 that discharges the grain into the grain tank 220. In other arrangements, the grain is lifted from the paddle chain lift 212 and then flipped at the top of the elevator to a sump, containing a bubble-up auger. The bubble-up auger transports grain from the sides of the grain tank 220 to the top center of the tank where the grain is discharged in the center of the tank 220 to naturally form a cone-shape pile, wherein the angles of the sides of the cone equal the angle of repose of the grain. Other arrangements implement other auger assemblies to either distribute the grain evenly along the bottom of the grain tank 220 or centrally in the middle of the grain tank 220. In this arrangement of grain tank 220, sloping side walls 222 and 224 are sloped such that as grain accumulates in the grain tank 220 as conveyed from dispenser auger 237, the grain naturally slides down to cross augers 226 and 228. These side walls 222 and 224 are sloped at such an angle that they convene at the bottom of the tank 220 to form the 'W' shape floor bottom, as shown. Grain tank cross augers 226 and 228 convey the accumulated grain laterally so that it may be collected into vertical tube 262 which includes an unload conveying vertical auger 264 that propels the grain upward. This allows grain to be moved into an unload vehicle via unload tube 260, which may include another unload conveying internal auger and may rotate about a pivot coextensive with vertical tube 262. Non-storable grain volume 270 is identified by slash marks in FIG. 2 to show space effectively unusable between the grain tank, and the threshing system 12 due to the geometry of the sloped sides 222 and 224 forming the floor of the grain tank 220.

FIG. 3 shows another agricultural combine 300 in which exemplary embodiments of the present invention may be implemented. Combine 300 includes an engine 370, cab 380 a grain tank 320. Grain tank 320 includes vertical side walls 322 and 324 and generally flat bottom 325. Along the bottom 325 of grain tank 320, a conveying system 330 is placed. Bottom 325 includes an active conveying system 330 such that grain tank 320 need not rely on gravity to feed grain into the cross auger. Conveying system 330, in some embodiments, conveys collected grain forward in the grain tank 320 to a single grain tank cross auger 326. Cross auger 326 then conveys the grain laterally to be collected by vertical tube 362, which includes a vertical unload conveying auger 364 to propel the grain upward. This sends grain into an unload tube 360, which may include another unload conveying auger (not shown).

Figure 4:
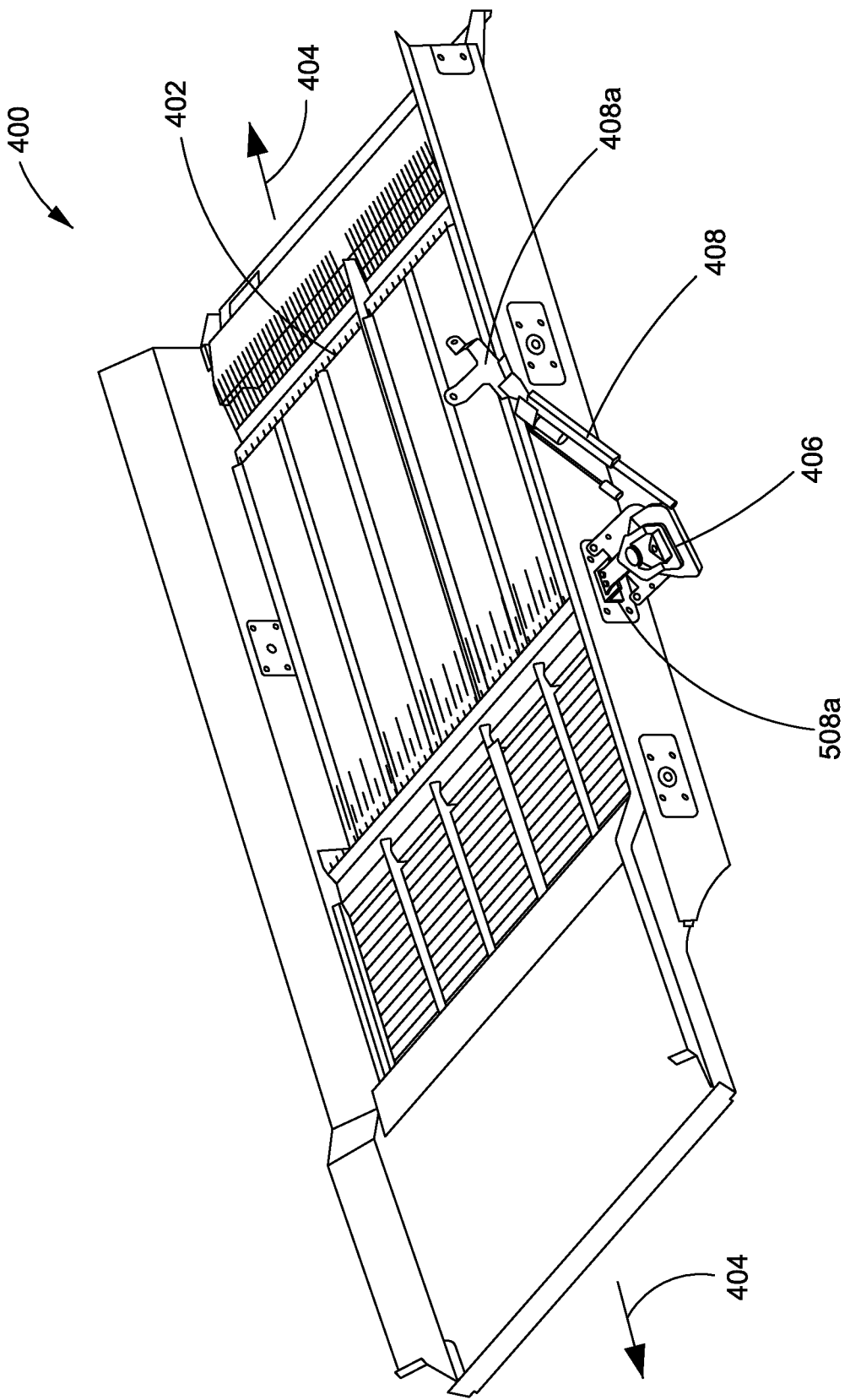
FIG. 4 is a perspective view of an exemplary combine side-shaking control system for use with embodiments of the present invention.

FIG. 4 illustrates an exemplary combine side-shaking control system 400 for use with embodiments of the present invention. As shown at FIG. 4, the side-shaking control system 400 may include a sieve 402 for separating crop material from other materials. The sieve 402 may be configured to move in a fore-aft direction shown by arrows 404. Side-shaking control system 400 may include side-shaking assembly 406 and actuation device 408, which is rigidly attached to a combine chassis 706 (shown in FIG. 7A) by an actuation device mounting portion 408a.

Figure 8:
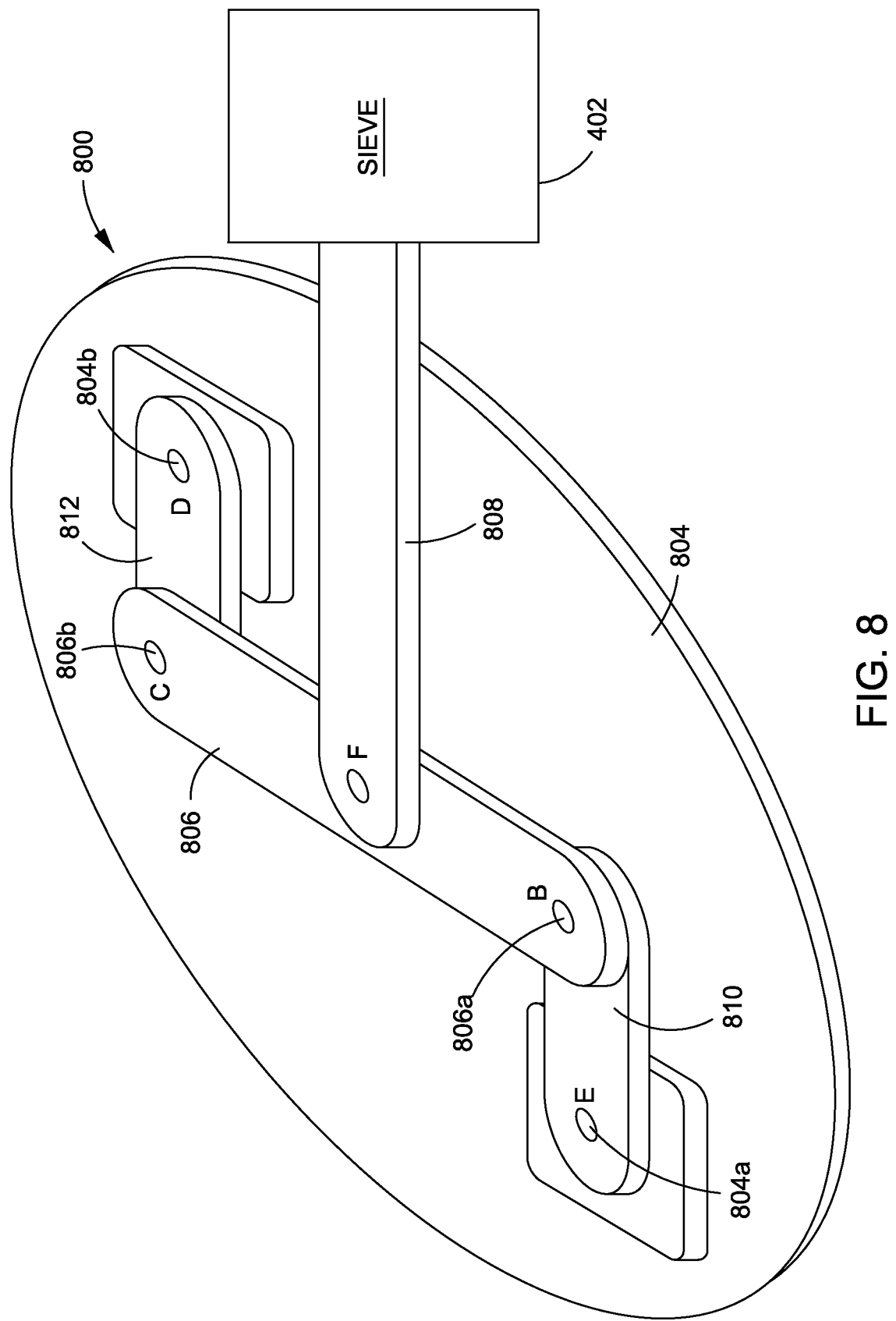
FIG. 8 is a schematic diagram of an exemplary side-shaking assembly illustrating a Watt's linkage for use with embodiments of the present invention.

Exemplary combine side-shaking control systems may include side-shaking assemblies having different linkage configurations for converting rotational motion to approximate straight-line motion. In some embodiments, an exemplary combine side-shaking control system may include a side-shaking assembly 406 having a Robert's linkage configuration for converting rotational motion to approximate straight-line motion. In other embodiments, an exemplary combine side-shaking control system may include a side-shaking assembly 800 having a Watt's linkage configuration for converting rotational motion to approximate straight-line motion. FIG. 8 is a perspective view of an exemplary side-shaking assembly illustrating a Watt's linkage for use with embodiments of the present invention. It is contemplated that other linkage configurations may be used for converting rotational motion to approximate straight-line motion.

Figure 5B:
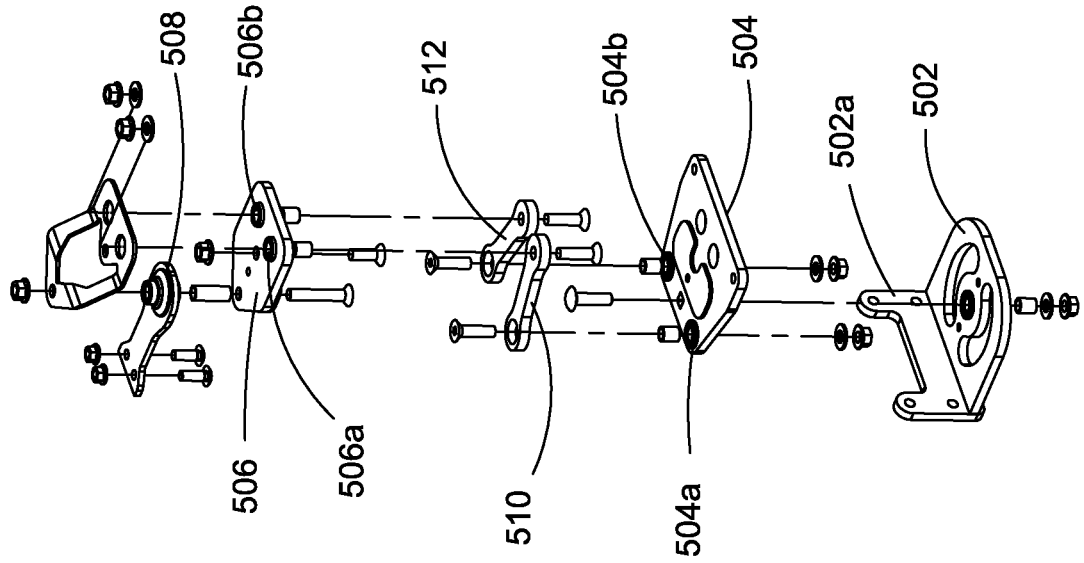
FIG. 5B is an exploded view of the exemplary side-shaking assembly shown at FIG. 5A illustrating a Robert's linkage for use with embodiments of the present invention.
Figure 5A:
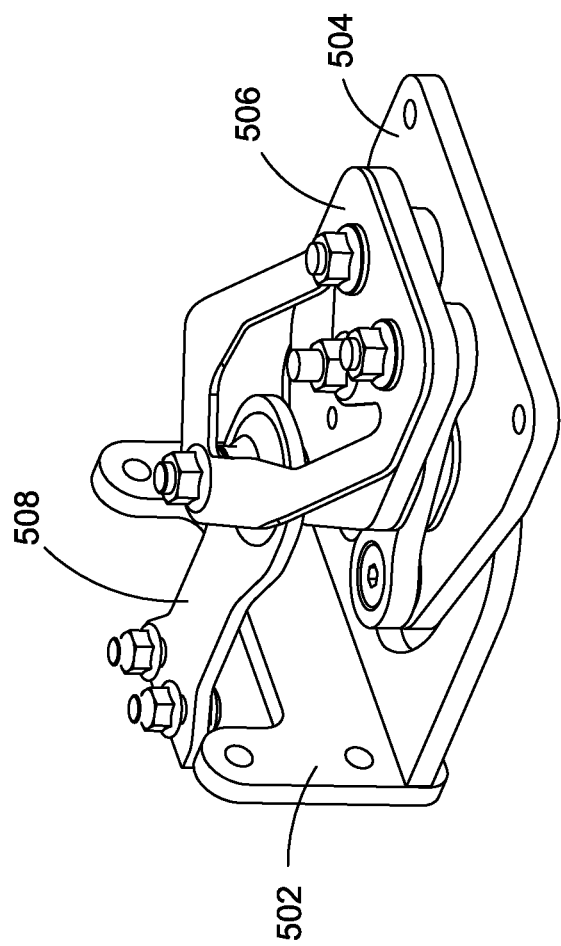
FIG. 5A is a perspective view of the exemplary side-shaking assembly shown in FIG. 4 illustrating a Robert's linkage for use with embodiments of the present invention.
Figure 7A:
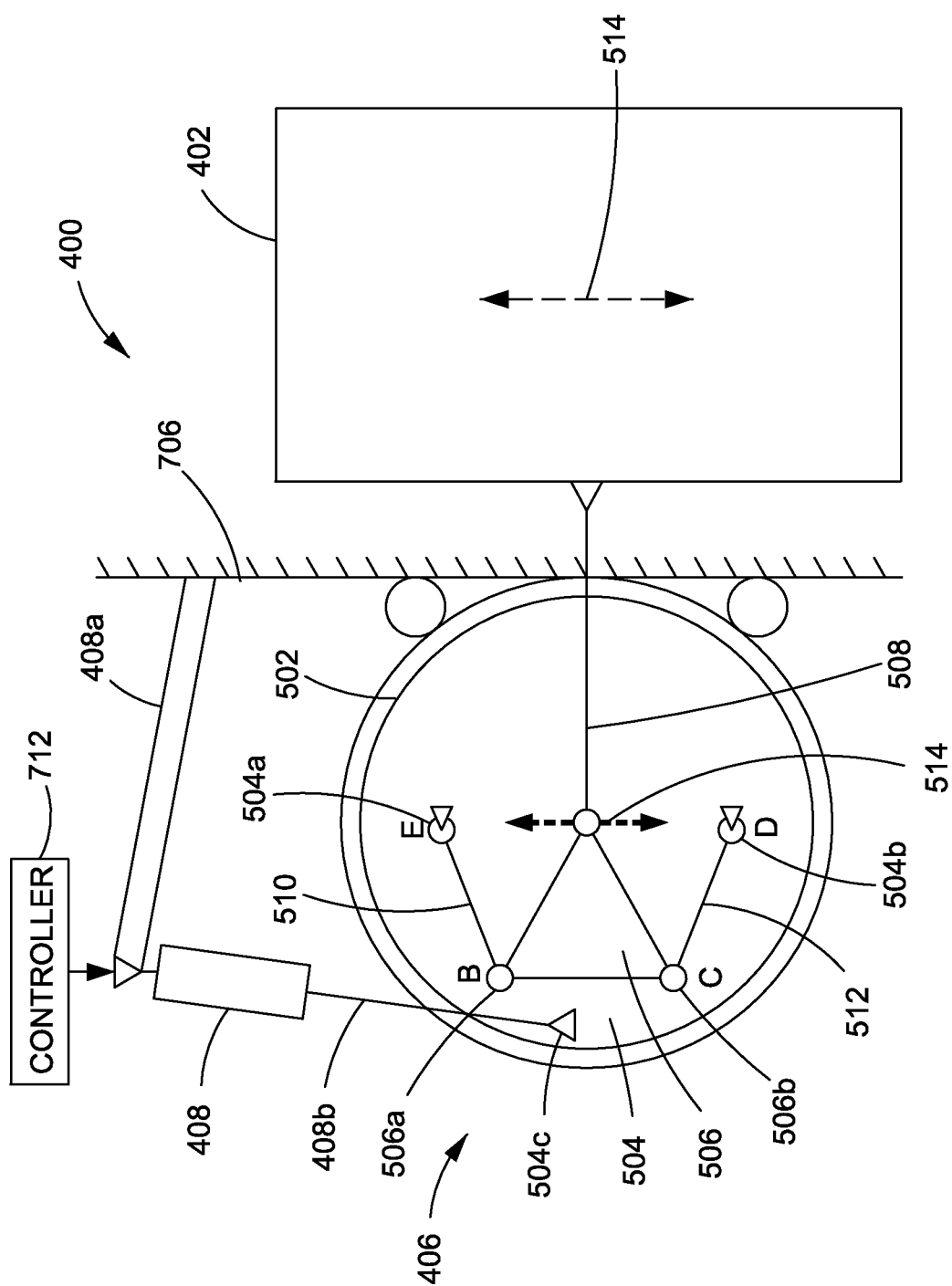
FIG. 7A is a schematic diagram illustrating the sieve, actuation device and side-shaking assembly shown at FIG. 4 in a non-engaging position for use with embodiments of the present invention.

Referring to FIG. 5A and FIG. 5B, the exemplary side-shaking assembly 406 (shown in FIG. 4) illustrates a Robert's linkage for use with embodiments of the present invention. FIG. 5B is an exploded view of the exemplary side-shaking assembly 406 shown in FIG. 5A. As shown at FIG. 5A and FIG. 5B, side-shaking assembly 406 includes a side-shaking mounting device 502 rigidly attached to a combine chassis 706 (shown in FIG. 7A). Side-shaking assembly 406 also includes a lower plate 504 and an upper plate 506 coupled to the lower plate 504. Side-shaking assembly 406 also includes a first pivot arm 510 coupled to lower plate 504 at a first lower plate pivot portion 504a and coupled to upper plate 506 at a first upper plate pivot portion 506a. Side-shaking assembly 406 also includes a second pivot arm 512 coupled to the lower plate 504 at a second lower plate pivot portion 504b spaced from the first lower plate pivot portion 504a and coupled to the upper plate 506 at a second upper plate pivot portion 506b spaced from the first upper plate pivot portion 506a. Side-shaking assembly 406 may further include a fixed arm 508 rotatably coupled to the upper plate 506 and rigidly attached to the sieve 402 (as shown at FIG. 7A). Fixed arm 508 may also include a fixed arm mounting portion 508a for rigidly attaching fixed arm 508 to the sieve 402. Side-shaking assembly 406 may further include a support device 514 rigidly attached to both fixed arm 508 and upper plate 506. In some embodiments, the fixed arm 508 and the support device 514 may be separate components that are not included as part of the side-shaking assembly 406.

Figure 6B:
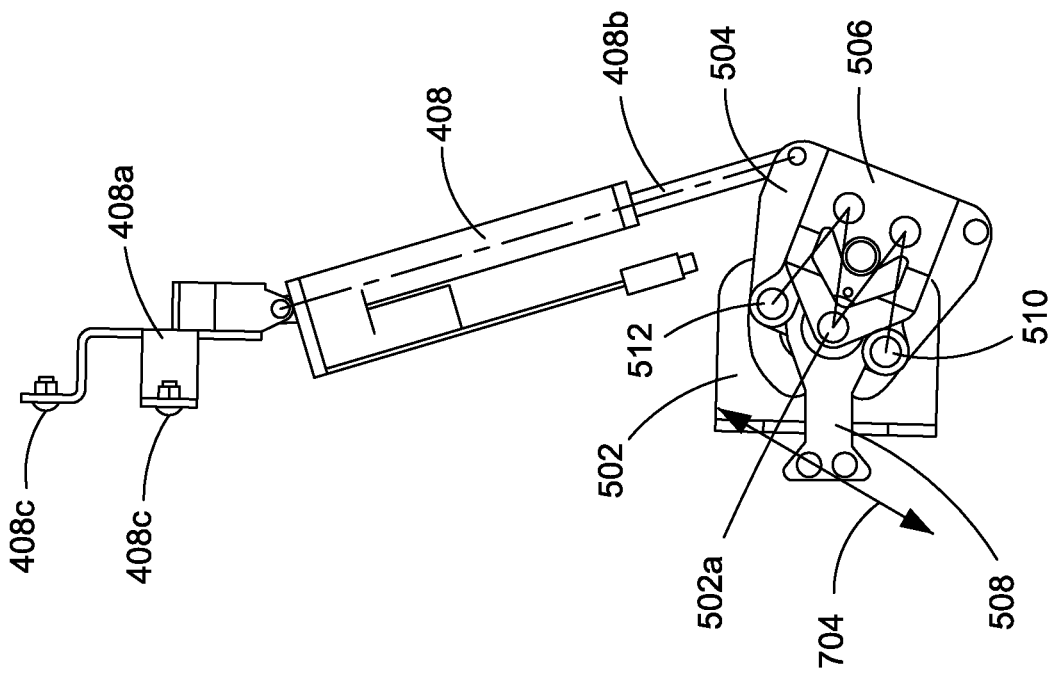
FIG. 6B is a top view of actuation device and side-shaking assembly shown at FIG. 4 in an engaging position for use with embodiments of the present invention.
Figure 6A:
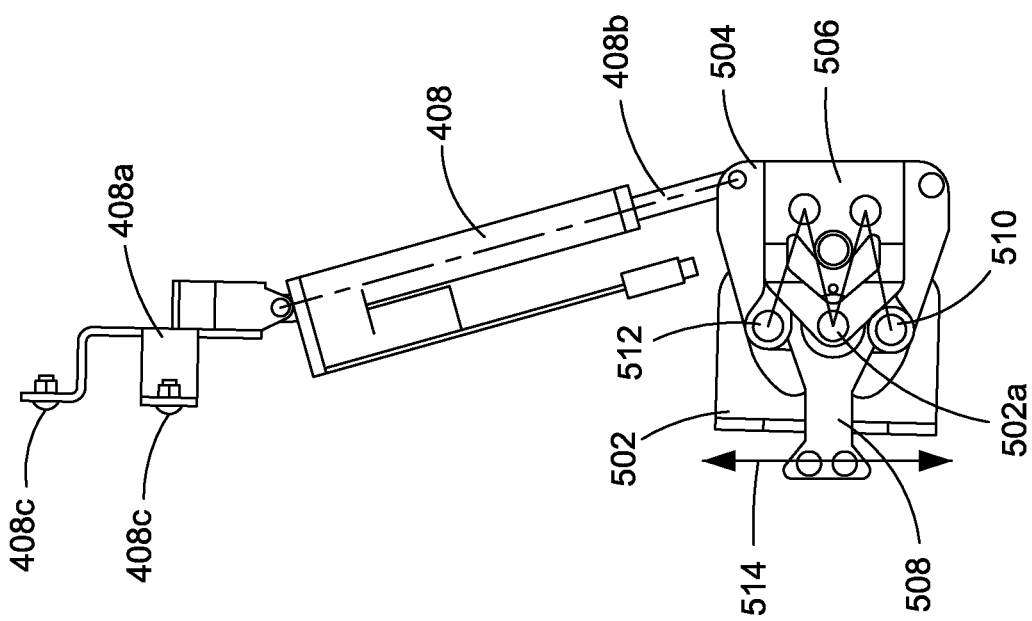
FIG. 6A is a top view of the actuation device and side-shaking assembly shown at FIG. 4 in a non-engaging position for use with embodiments of the present invention.
Figure 7B:
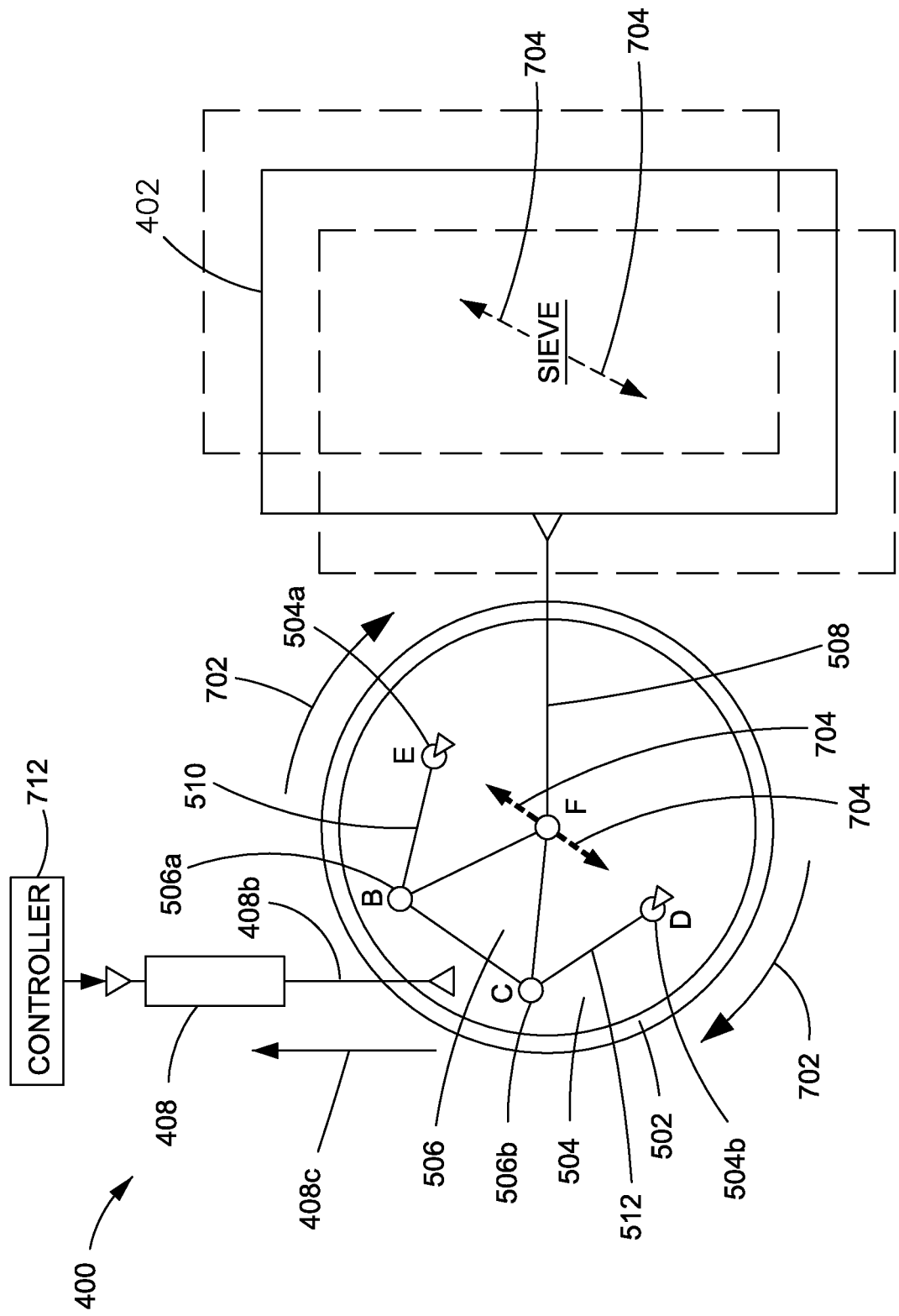
FIG. 7B is a schematic diagram illustrating the sieve, actuation device and side-shaking assembly shown at FIG. 4 in an engaging position for use with embodiments of the present invention.

When the lower plate 504 and the upper plate 506 are in the non-engaging position, the side-to-side component of the sieve 402 is not engaged. When the lower plate 504 and the upper plate 506 are in the engaging position, the side-to-side component of the sieve 402 is engaged. FIG. 6A through FIG. 7C illustrate relative movements of elements of the exemplary side-shaking assembly 406, actuation device 408 and sieve 402 shown at FIG. 4 during a non-engaging position and first and second engaging positions. FIG. 6A is a top view of actuation device 408 and side-shaking assembly 406 in a non-engaging position. FIG. 7A is a schematic diagram illustrating sieve 402, actuation device 408 and side-shaking assembly 406 in a non-engaging position and a controller 712. FIG. 6B is a top view of actuation device 408 and side-shaking assembly 406 in an engaging position. FIG. 7B is a schematic diagram illustrating sieve 402, actuation device 408 and side-shaking assembly 406 in an engaging position.

As shown at FIG. 6A, actuation device 408 may include fasteners 408c and an actuation device mounting portion 408a. Actuation device mounting portion 408a may be used to rigidly attach the actuation device 408 to the combine chassis 706 (shown at FIG. 7A). It is contemplated that an exemplary actuation device may be directly attached to the chassis or may be attached to the chassis using a mounting portion having a different size and shape. Actuation device 408 is coupled to the lower plate 504 at an actuation coupling portion 504c (shown at FIG. 7A).

Upper plate 506 may be configured to have a substantially linear upper plate motion in a substantially linear direction. For example, as shown at FIGS. 6A and 7A, when actuation device moving portion 408b is in the position shown at FIG. 6A and FIG. 7A, the lower plate 504 and the upper plate 506 are in a non-engaging position. Further, as shown at FIG. 7A, when the lower plate 504 and the upper plate 506 are in the non-engaging position, the upper plate 506 is configured to have a non-engaging substantially linear motion in the fore-aft direction, shown by arrows 514. The sieve 402 may be controlled to remain stationary or move in the fore-aft direction 514, when the lower plate 504 and the upper plate 506 are in the non-engaging position. The fore-aft motion 514 may be controlled by an actuation device different from the actuation device 408. When the sieve 402 moves in the fore-aft direction 514, the fixed arm 508 may be configured such that the fore-aft motion 514 of the sieve 402 is in the substantially linear direction 514 of the upper plate motion.

Line B-E in FIG. 7A represents first pivot arm 510 (shown at FIG. 5B) coupled to lower plate 504 at a first lower plate pivot portion 504a (point E) and coupled to upper plate 506 at a first upper plate pivot portion 506a (point B). Line C-D in FIG. 7A represents second pivot arm 512 (shown at FIG. 5B) coupled to the lower plate 504 at a second lower plate pivot portion 504b (point D) and coupled to the upper plate 506 at a second upper plate pivot portion 506b (point C). Line B-C extends between the first upper plate pivot portion 506a (point B) and the second upper plate pivot portion 506b (point C). As shown at FIG. 7A, when the lower plate 504 and the upper plate 506 are in the non-engaging position, the sieve 402 is controlled to move in the substantially linear direction 514 of the upper plate substantially linear motion which is substantially parallel to line B-C extending between the first upper plate pivot portion 506a and the second upper plate pivot portion 506b.

According to some exemplary embodiments, lower plate 504 may be rotatably coupled to the mounting device 502 and configured to rotate about a lower plate axis 502a. Actuation device 408 may be configured to rotate the lower plate 504 about the lower plate axis 502. For example, as shown at FIG. 6B and FIG. 7B, when actuation device moving portion 408b retracts, as indicated by arrow 408c from the position shown at FIG. 6A and FIG. 7A, lower plate 504, which is coupled to mounting device 502, rotates, indicated by arrows 702, relative to the mounting device 502 about lower plate axis 502 (shown at FIG. 4) to an engaging position. Upper plate 506 may be configured to have an upper plate rotational motion and rotate (also indicated by arrows 702) responsive to the rotation of the lower plate 504.

Upper plate 506 may also have an engaging motion in a substantially linear direction 704 different from the non-engaging substantially linear direction 514 (shown at FIG. 6A and FIG. 7A). Responsive to the rotation of the lower plate 504, the sieve is controlled to move diagonal 704 to the fore-aft direction 514 (shown at FIG. 7A) in the substantially linear direction 704 of the upper plate engaging motion. For example, responsive to the rotation of the lower plate 504, the fixed bar 508 is configured such that the sieve 402 moves diagonal 704 to the fore-aft direction 514 (shown at FIG. 7A). That is, the sieve 402 also moves in the substantially linear direction 704 of the upper plate engaging motion when the upper plate 506 is rotated to an engaging position. Further, as was the case in the non-engaging position, the sieve 402 moves in the corresponding substantially linear direction of the upper plate motion when the upper plate 506 is in its respective position. That is, when the upper plate 506 is rotated to an engaging position, the sieve 402 moves in the substantially linear direction 704 of the upper plate motion which is substantially parallel to the line B-C extending between the first upper plate pivot portion 506a and the second upper plate pivot portion 506b. Accordingly, a side-to-side component is added to the fore-aft component to move the sieve 402 diagonal 704 to the fore-aft direction 514 (shown at FIG. 7A) in the substantially linear direction 704 of the upper plate engaging motion. In the embodiments described herein, substantially linear may be indicated by the sieve's deviation from center as a function of the sieve's fore-aft movement. For example, substantially linear movement indicates that the motion may not deviate more than 2.5% from a straight line linear motion. That is, if the sieve 402 moves 100 mm in the fore-aft direction, indicted by arrows 514, the sieve maintains substantially linear movement if the sieve 402 does not move further than 2.5 mm from the line of fore-aft direction.

Figure 7C:
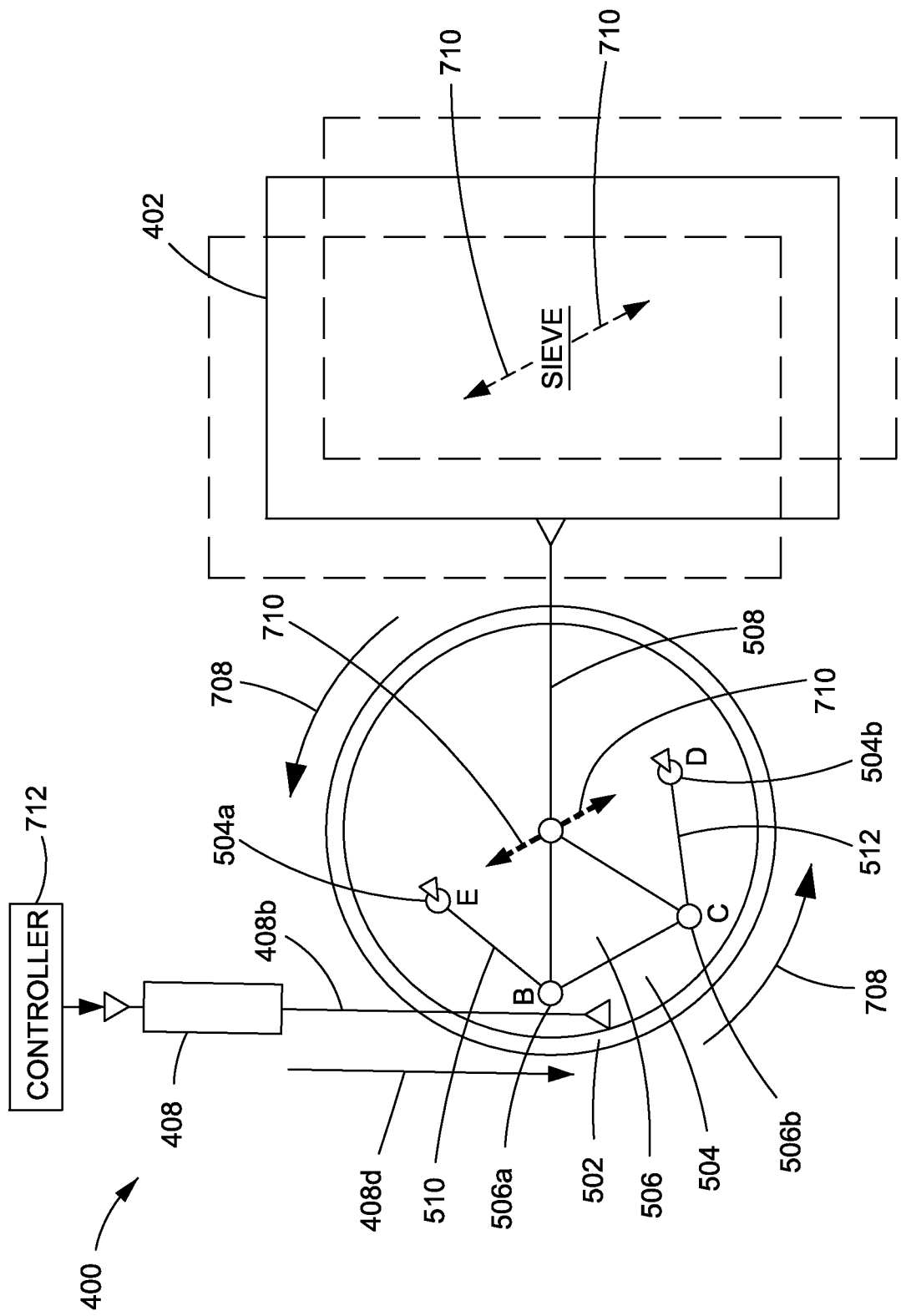
FIG. 7C is a schematic diagram illustrating the sieve, actuation device and side-shaking assembly shown at FIG. 4 in a second engaging position for use with embodiments of the present invention.

In some exemplary embodiments, an exemplary side-shaking assembly 406 may include at a first engaging position and a second engaging position. For example, upper plate 506 and lower plate 504 may rotate to the first engaging position described above and shown at FIG. 6B and FIG. 7B. Upper plate 506 and lower plate 504 may also rotate to a second engaging position, as shown at FIG. 7C. For example, when actuation device moving portion 408b expands, as indicated by arrow 408d, from the position shown at FIG. 6A and FIG. 7A, lower plate 504 rotates in the direction indicated by arrows 708 relative to the mounting device 502 about lower plate axis 502a (shown at FIG. 4) to the second engaging position shown at FIG. 7C. Upper plate 506, which may be configured to have an upper plate rotational motion, rotates (also indicated by arrows 708) responsive to the rotation of the lower plate 504.

Upper plate 506 may also have a second engaging motion in a substantially linear direction 710 different from the first engaging substantially linear direction 704 (shown at FIG. 7B) when the upper plate 506 rotates to the first engaging position. Responsive to the rotation of the lower plate 504, the sieve 402 is controlled to move diagonal to the fore-aft direction 514 (shown at FIG. 7A) in the second engaging substantially linear direction 710 of the upper plate motion when the lower plate 504 and the upper plate 506 are in the second engaging position shown at FIG. 7C. For example, responsive to the rotation of the lower plate 504, the fixed bar 508 is configured such that the sieve 402 moves diagonal to the fore-aft direction 514 (shown at FIG. 7A). That is, the sieve 402 also moves in the substantially linear direction 710 of the upper plate engaging motion when the upper plate 506 is rotated to the second engaging position. Further, as was the case in the non-engaging position and the first engaging position, the sieve 402 moves in the corresponding substantially linear direction of the upper plate motion when the upper plate 506 is in its respective position. That is, when the upper plate 506 is rotated to the second engaging position, the sieve 402 moves in the substantially linear direction 710 of the upper plate motion which is substantially parallel to the line B-C extending between the first upper plate pivot portion 506a and the second upper plate pivot portion 506b.

As described above, exemplary combine side-shaking control systems may include side-shaking assemblies having different linkage configurations for converting rotational motion to approximate straight-line motion. FIG. 8 is a perspective view of an exemplary side-shaking assembly 800 illustrating a Watt's linkage for use with embodiments of the present invention. As shown at FIG. 8, side-shaking assembly 800 includes a lower plate 804 and an upper plate 806 coupled to the lower plate 804. Lower plate 804 may be rotatably coupled to a mounting device, such as mounting device 502 (shown at FIG. 5B), which is rigidly attached to a combine chassis 706 (shown in FIG. 9A). Side-shaking assembly 800 also includes a first pivot arm 810 coupled to lower plate 804 at a first lower plate pivot portion 804a and coupled to upper plate 806 at a first upper plate pivot portion 806a. Side-shaking assembly 800 also includes a second pivot arm 812 coupled to the lower plate 804 at a second lower plate pivot portion 804b spaced from the first lower plate pivot portion 804a and coupled to the upper plate 806 at a second upper plate pivot portion 806b spaced from the first upper plate pivot portion 806a. Side-shaking assembly 800 further includes a fixed arm 808 rotatably coupled to the upper plate 806 and rigidly attached to the sieve 402. Fixed arm 808 may also include a fixed arm mounting portion, such as fixed arm mounting portion 508a for rigidly attaching fixed arm 808 to the sieve 402. In some embodiments, fixed arm 808 and fixed arm mounting portion 508a may be separate components that are not included as part of the side-shaking assembly 406.

Figure 9A:
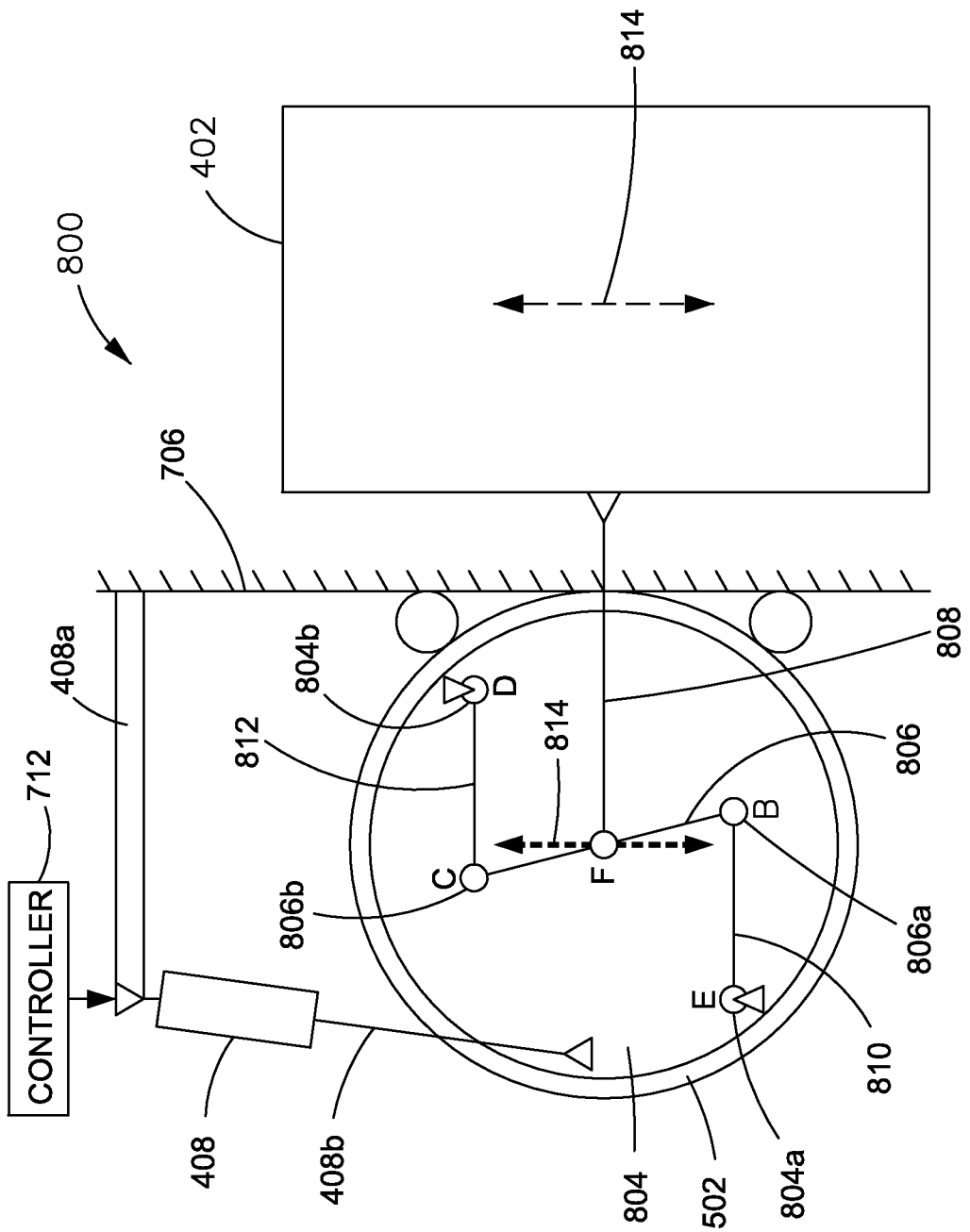
FIG. 9A is a schematic diagram illustrating the sieve, actuation device and side-shaking assembly shown at FIG. 8 in a non-engaging position for use with embodiments of the present invention.
Figure 9B:
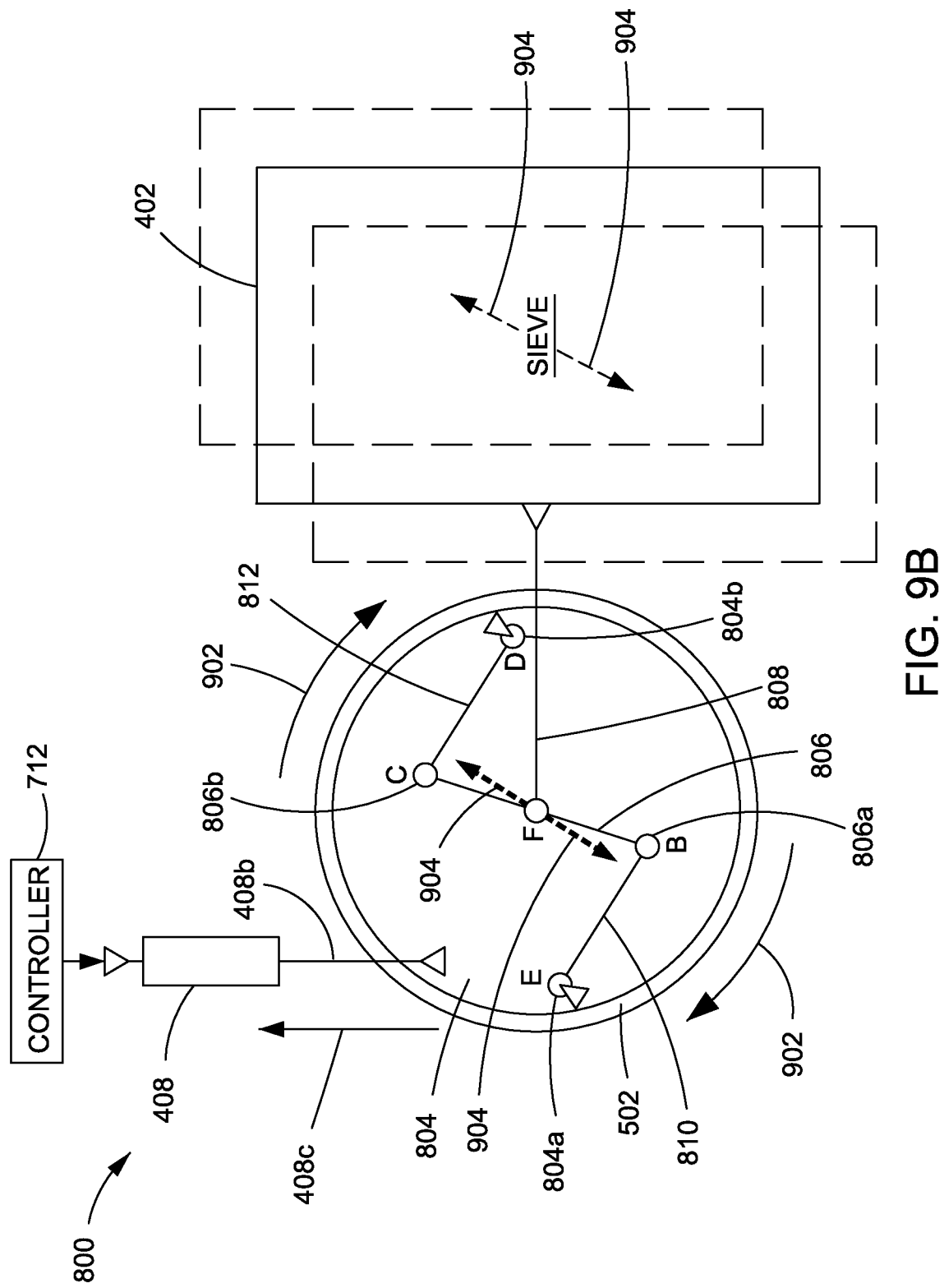
FIG. 9B is a schematic diagram illustrating the sieve, actuation device and side-shaking assembly shown at FIG. 8 in a first engaging position for use with embodiments of the present invention.
Figure 9C:
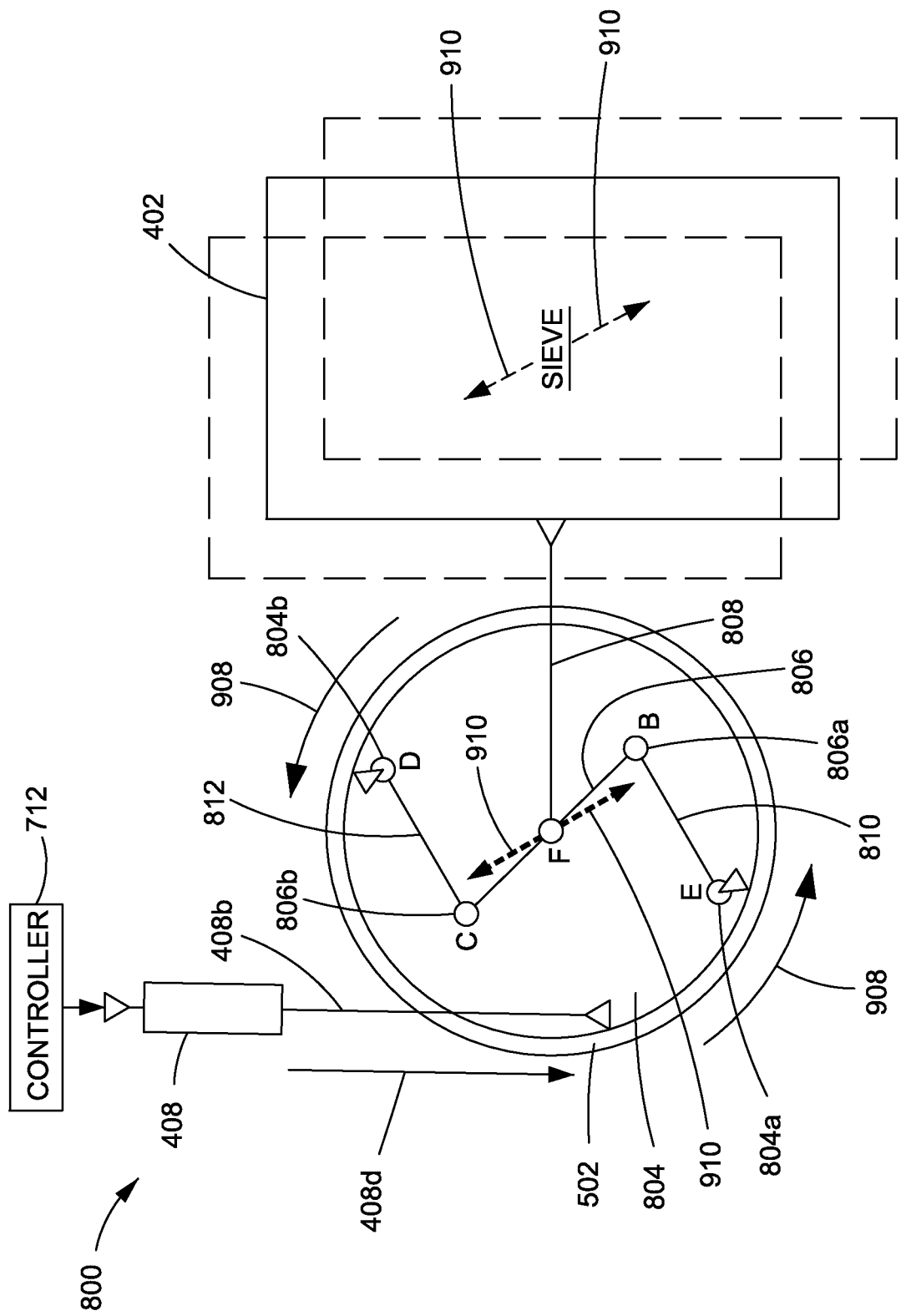
FIG. 9C is a schematic diagram illustrating the sieve, actuation device and side-shaking assembly shown at FIG. 8 in a second engaging position for use with embodiments of the present invention.

When the lower plate 804 and the upper plate 806 are in the non-engaging position, the side-to-side component of the sieve 402 is not engaged. When the lower plate 504 and the upper plate 506 are in the engaging position, the side-to-side component of the sieve 402 is engaged. FIG. 9A through FIG. 9C illustrate relative movements of elements of the exemplary side-shaking assembly 800, actuation device 408 and sieve 402 during a non-engaging position and first and second engaging positions. FIG. 9A is a schematic diagram illustrating sieve 402, actuation device 408 and side-shaking assembly 800 in a non-engaging position.

As shown at FIG. 9A, upper plate 804 may be configured to have a substantially linear upper plate motion in a substantially linear direction 814. For example, when actuation device moving portion 408b is in the position shown at FIG. 9A, the lower plate 804 and the upper plate 806 are in a non-engaging position. Further, when the lower plate 804 and the upper plate 806 are in the non-engaging position, the upper plate 806 is configured to have a non-engaging motion in a non-engaging substantially linear direction 814. The sieve 402 may be controlled to remain stationary or move in a non-engaging substantially linear direction 814, as shown by the arrows 814 at sieve 402, when the lower plate 502 (shown at FIG. 5B) and the upper plate 804 are in the non-engaging position. When the sieve 402 moves in the fore-aft direction 814, the fixed arm 808 may be configured such that the fore-aft motion 814 of the sieve 402 is in the substantially linear direction 814 of the upper plate motion.

Line B-E in FIG. 9A represents first pivot arm 810 (shown at FIG. 8) coupled to lower plate 804 at a first lower plate pivot portion 804a (point E) and coupled to upper plate 806 at a first upper plate pivot portion 806a (point B). Line C-D in FIG. 9A represents second pivot arm 812 (shown at FIG. 8) coupled to the lower plate 804 at a second lower plate pivot portion 804b (point D) and coupled to the upper plate 806 at a second upper plate pivot portion 806b (point C). Line B-C extends between the first upper plate pivot portion 806a (point B) and the second upper plate pivot portion 806b (point C). As shown at FIG. 9A, when the lower plate 804 and the upper plate 806 are in the non-engaging position, the sieve 402 is controlled to move in the substantially linear direction 814 of the upper plate substantially linear motion which is substantially perpendicular to the first pivot arm 810 and the second pivot arm 812.

According to some exemplary embodiments, side-shaking assembly 800 having a Watt's linkage configuration may include a first engaging position. FIG. 9B is a schematic diagram illustrating sieve 402, actuation device 408 and side-shaking assembly 800 in a first engaging position. As shown at FIG. 9B, lower plate 804 may be rotatably coupled to the mounting device 502 and configured to rotate about a lower plate axis (not shown) at point F. Actuation device 408 may be configured to rotate the lower plate 804 about the lower plate axis. When actuation device moving portion 408b retracts (indicated by arrow 408c) from the position shown at FIG. 9A, lower plate 804, which is coupled to mounting device 502, rotates in the direction indicated by arrows 902 relative to the mounting device 502 about the lower plate axis to an engaging position. Upper plate 806 may be configured to have an upper plate rotational motion and rotate (also indicated by arrows 902) responsive to the rotation of the lower plate 804.

Upper plate 806 may also have an engaging motion in a substantially linear direction 904 different from the non-engaging substantially linear direction 814 (shown at FIG. 8). Responsive to the rotation of the lower plate 804, the sieve 402 is controlled to move diagonal to the fore-aft direction 814 (shown at FIG. 7A) in the substantially linear direction 904 of the upper plate engaging motion. For example, responsive to the rotation of the lower plate 804, the fixed bar 808 is configured such that the sieve 402 moves diagonal to the fore-aft direction 514 (shown at FIG. 9A). That is, the sieve 402 also moves in the substantially linear direction 904 of the upper plate engaging motion when the upper plate 806 is rotated to an engaging position. Further, as was the case in the non-engaging position, the sieve 402 moves in the corresponding substantially linear direction of the upper plate motion when the upper plate 806 is in its respective position. That is, when the upper plate 806 is rotated to the first engaging position shown at FIG. 9B, the sieve 402 moves in the substantially linear direction 904 of the upper plate motion which is substantially perpendicular to the first pivot arm 810 and the second pivot arm 812.

According to some exemplary embodiments, side-shaking assembly 800 having a Watt's linkage configuration may include a second engaging position. FIG. 9C is a schematic diagram illustrating sieve 402, actuation device 408 and side-shaking assembly 800 in a second engaging position. As shown at FIG. 9C, upper plate 806 and lower plate 804 may also rotate to a second engaging position, different from the first engaging position described above and shown at FIG.

9B. For example, when actuation device moving portion 408b expands, as indicated by arrow 408d, from the position shown at FIG. 9A, lower plate 804 rotates in the direction indicated by arrows 908 relative to the mounting device 502 about lower plate axis (at point F) to the second engaging position shown at FIG. 9C. Upper plate 806, which may be configured to have an upper plate rotational motion, rotates (also indicated by arrows 908) responsive to the rotation of the lower plate 804.

Upper plate 806 may also have a second engaging motion in a substantially linear direction 910 different from the first engaging substantially linear direction 904 (shown at FIG. 9B) when the upper plate 806 rotates to the first engaging position. Responsive to the rotation of the lower plate 804, the sieve 402 is controlled to move diagonal to the fore-aft direction 814 (shown at FIG. 9A) and move in the second engaging substantially linear direction 910 of the upper plate motion when the lower plate 804 and the upper plate 806 are in the second engaging position shown at FIG. 9C. For example, responsive to the rotation of the lower plate 804, the fixed bar 808 is configured such that the sieve 402 moves diagonal to the fore-aft direction 514 (shown at FIG. 7A). That is, the sieve 402 also moves in the substantially linear direction 910 of the upper plate engaging motion when the upper plate 806 is rotated to the second engaging position. Further, as was the case in the non-engaging position and the first engaging position, the sieve 402 moves in the corresponding substantially linear direction of the upper plate motion when the upper plate 806 is in its respective position. That is, when the upper plate 806 rotates to the second engaging position shown at FIG. 9C, the sieve 402 moves in the substantially linear direction 910 of the upper plate motion which is which is substantially perpendicular to the first pivot arm 810 and the second pivot arm 812.

Although the actuation device shown in the exemplary embodiments described above is a linear actuator, an exemplary actuation device may, for example, include an electric actuator, a hydraulic actuator, a pneumatic actuator and a motor. For example, as shown at FIG. 7D and FIG. 9D, an exemplary side-shaking control system 700, 900 may include a motor 720 configured to rotate a lower plate 904, about a lower plate axis.

Figure 7D:
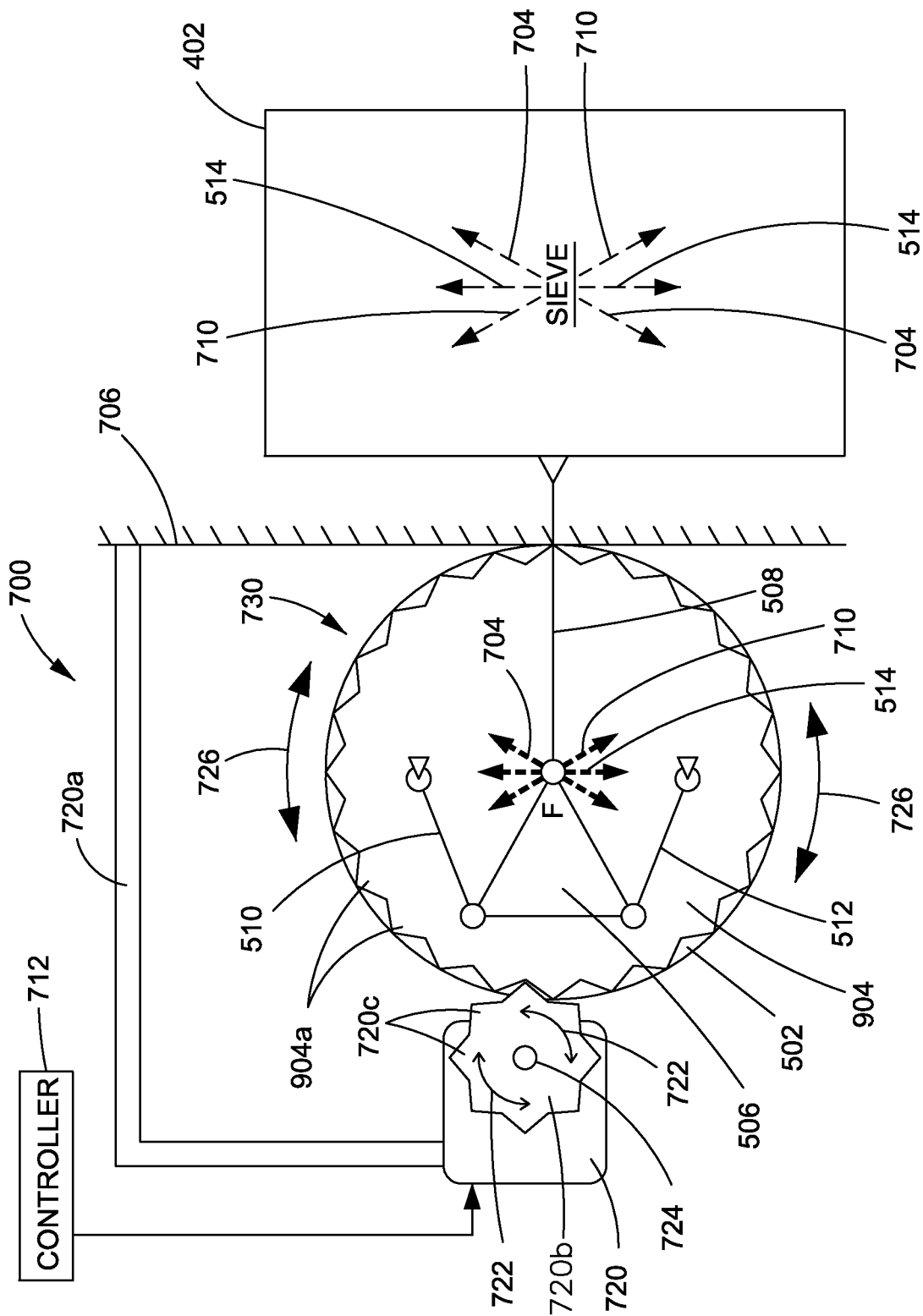
FIG. 7D is a schematic diagram illustrating the sieve, a motor and a side-shaking assembly having a Robert's linkage for use with embodiments of the present invention.

Referring to the embodiment shown at FIG. 7D, side-shaking control system 700 may include a side shaking assembly 730 having a Robert's linkage configuration. Side-shaking assembly 730 may include a lower plate 904 having lower plate teeth 904a. Side-shaking assembly 730 may also include other elements which are described above with reference to FIGS. 5A and 5B. Side-shaking control system 700 may also include motor 720. As shown, motor 720 may be rigidly attached to the combine chassis 706 and coupled to the lower plate 904. Motor 720 may be configured to rotate lower plate 904, about a lower plate axis (at point F). For example, motor 720 may include a moving portion 720b having a plurality of motor teeth 720c which are configured to couple to lower plate teeth 904a for rotating lower plate 904 about a lower plate axis at point F. When motor moving portion 720b rotates in the direction indicated by arrows 722 about motor axis 724, lower plate 904, which may be coupled to mounting device 502, rotates in the direction indicated by arrows 726, relative to the mounting device 502 about the lower plate axis at point F to first and second engaging positions. Upper plate 506 may also rotate in the direction indicated by arrows 726 responsive to the rotation of the lower plate 904. Responsive to the rotation of the lower plate 904 and the upper plate 506, the sieve 402 may be controlled to move diagonal to the fore-aft direction 514 in the corresponding substantially linear directions 704 and 710 of the upper plate engaging motion when the upper plate 506 is in its respective first and second engaging positions.

Figure 9D:
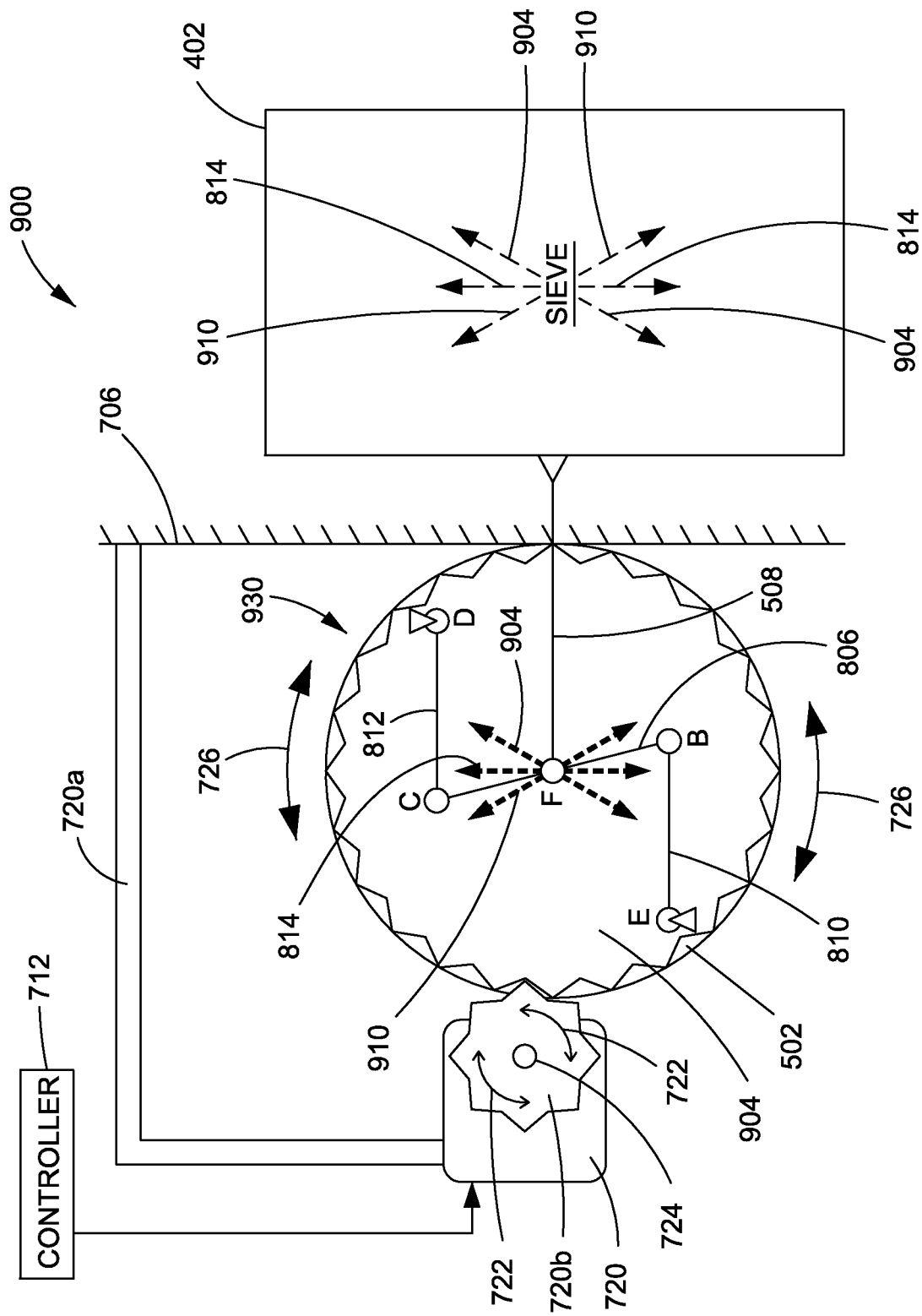
FIG. 9D is a schematic diagram illustrating the sieve, a motor and a side-shaking assembly having a Watt's linkage for use with embodiments of the present invention.

Referring to the embodiment shown at FIG. 9D, side-shaking control system 900 may include a side shaking assembly 930 having a Watt's linkage configuration. Side-shaking assembly 930 may also include lower plate 904 having lower plate teeth 904a. Side-shaking assembly 730 may also include other elements which are described above with reference to FIG. 8. Side-shaking control system 700 may also include motor 720. Responsive to the rotation of the lower plate 904 and the upper plate 506, the sieve 402 may be controlled to move diagonal to the fore-aft direction 814 in the corresponding substantially linear directions 904 and 910 of the upper plate engaging motion when the upper plate 806 is in its respective first and second engaging positions.

According to some exemplary embodiments, a side-shaking control system, such as side-shaking control system 760 at FIG. 7E and side-shaking control system 960 at FIG. 9E, may include a first side-shaking assembly 740, 940 and a second side-shaking assembly 750, 950. FIG. 7E is a schematic diagram of an exemplary side-shaking control system 760 illustrating the sieve 402, actuation device 408, a first side-shaking assembly 740 having a Robert's linkage configuration and a second side-shaking 750 assembly having Robert's linkage configuration. FIG. 9E is a schematic diagram of an exemplary side-shaking control system 960 illustrating the sieve 402, actuation device 408, a first side-shaking assembly 940 having a Watt's linkage configuration and a second side-shaking assembly 950 having Watt's linkage configuration.

As shown at FIG. 7E and FIG. 9E, first side-shaking assembly 740, 940 may include a first mounting device 742, 752 rigidly coupled to the combine chassis 706 and a first lower plate 744, 944 rotatably coupled to the first mounting device 742, 752 and configured to rotate about a first lower plate axis at point X. First side-shaking assembly 740, 940 may also include a first upper plate 746, 946 coupled to the first lower plate 744, 944 and configured to rotate responsive to the rotation of the first lower plate 744, 944 and configured to have first upper plate substantially linear motion in the substantially linear direction 514 (shown at FIG. 7A) and 814 (shown at FIG. 9A). First side-shaking assembly 740, 940 may further include a first fixed arm 748, 948 coupled between the first upper plate 944 and the sieve 402. Second side-shaking assembly 750, 950 may include a second mounting device 752, 952 rigidly coupled to the combine chassis 706 and a second lower plate 754, 954 rotatably coupled to the second mounting device 752, 952 and configured to rotate about a second lower plate axis at point Y. Second side-shaking assembly 750, 950 may also include a second upper plate 756, 956 coupled to the second lower plate 754, 954 and configured to rotate responsive to the rotation of the second lower plate 754, 964 and configured to have second upper plate substantially linear motion in the substantially linear direction 514 (shown at FIG. 7A) and 814 (shown at FIG. 9A). Second side-shaking assembly 750, 950 may further include a second fixed arm 758, 958 coupled between the second upper plate 756, 956 and the sieve 402.

According to an aspect of the embodiments shown at FIGS. 7E and 9E, a side-shaking control system 760, 960 may also include a moving device 760 coupled to the first lower plate 744, 944, the second lower plate 754, 954 and the actuation device 408 and configured to rotate the first lower plate 744, 944 and the second lower plate 754, 794. The actuation device may be configured to rotate the first lower plate 744, 944 and the second lower plate 754, 954 by moving the moving device

760. It is contemplated that a first actuation device may be configured to rotate the first lower plate 744, 944 and a second actuation device may be configured to rotate the second lower plate 754, 794.

According to some embodiments, a controller 712 may receive an instruction to cause actuation device 408, 720 to rotate the lower plate 504, 804, 904, 944, 954 to a non-engaging position, a first engaging position and a second engaging position. Controller 712 may receive an instruction from an operator of the combine. The instructions may also be based on sensed operating conditions of the combine from sensors (not shown). Controller 712 may be configured to control the sieve 402 to move in the fore-aft direction 514, 814 by causing the actuation device 408 to rotate the lower plate 504, 804, 904, 944, 954 to a non-engaging position. The fore-aft direction 514, 814 of the sieve 402 may also be directly controlled by controller 712 (e.g., controlling another actuation device coupled to sieve). The fore-aft direction 514, 814 of the sieve 402 may also be controlled by another controller (not shown) different than controller 712. Controller 712 may be also be configured to move the sieve 402 diagonal to the fore-aft direction 514, 814 in the substantially linear direction of the substantially linear upper plate motion by causing the actuation device 408 to rotate the lower plate 504, 804, 904, 944, 954 to first and second non-engaging positions. It is also contemplated that an exemplary side-shaking mechanism may include more than two engaging positions and that controller 712 may receive an instruction to cause actuation device 408, 720 to rotate the lower plate 504, 804, 904, 944, 954 to more than two engaging positions.

Figure 10:
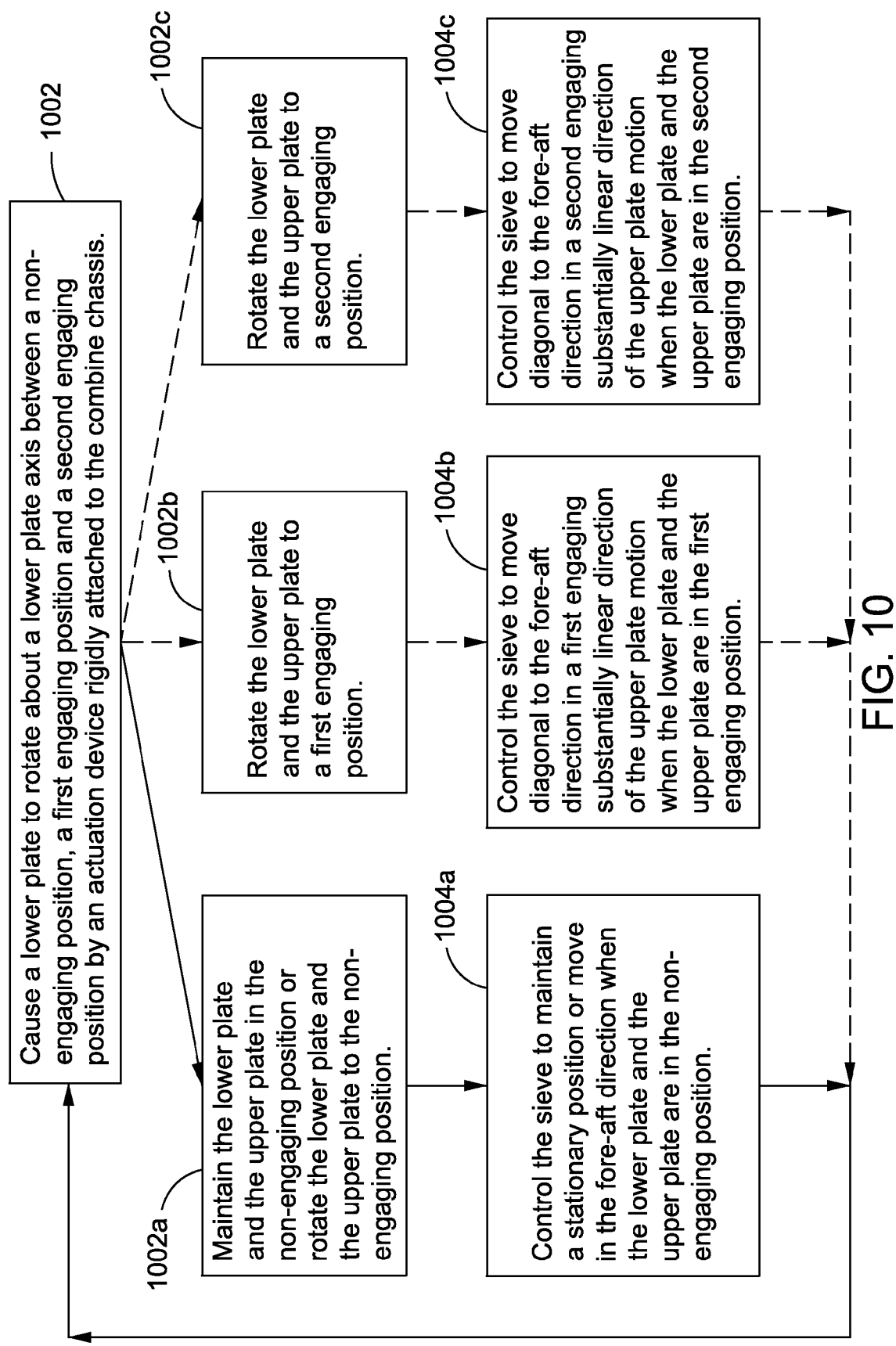
FIG. 10 is a flow chart illustrating an exemplary method for controlling movement of a sieve in a combine in accordance with an embodiment of the invention.

FIG. 10 is a flow chart illustrating an exemplary method for controlling movement of a sieve 402 in a combine 100, 200, 300 in accordance with an embodiment of the invention. As shown at block 1002, the method includes causing, by an actuation device attached to the combine chassis, a lower plate to rotate about a lower plate axis. For example, in the exemplary embodiments shown at FIG. 7A through 7C, actuation device 408, which is attached to the combine chassis 706, may cause lower plate 504 to rotate about lower plate axis 502a. Controller 712 may receive an instruction to cause actuation device 408 to rotate the lower plate 504. In the exemplary embodiments shown at FIG. 9A through 9C, actuation device 408, which is attached to the combine chassis 706, may cause lower plate 804 to rotate about lower plate axis at point F. Accordingly, the lower plate 504 may be caused to rotate between a non-engaging position, a first engaging position and a second engaging position.

As shown at block 1002a, 1002b and 1002c, the method includes rotating, responsive to the rotation of the lower plate, an upper plate between a non-engaging position, a first engaging position and a second engaging position. For example, in the exemplary embodiments shown at FIG. 7A through 7C, the lower plate and the upper plate may be rotated between a non-engaging position at block 1002a, a first engaging position at block 1002b and a second engaging position at block 1002c. It is contemplated that the upper plate 506 may be defaulted to the non-engaging position when the side-shaking assembly is disengaged. In this case, the upper plate 506 may be controlled to remain in the non-engaging position shown at FIG. 7A. It is also contemplated that the upper plate 506 may be rotated to the non-engaging position from the first engaging position or the second engaging position. In the non-engaging position shown at FIG. 7A, upper plate 506 may have a substantially linear motion in a non-engaging substantially linear direction 514. In the first engaging position shown at FIG. 7B, upper plate 506 may have a substantially linear motion in a first engaging substantially linear direction 704. In the second engaging position shown at FIG. 7C, upper plate 506 may have a substantially linear motion in a second engaging substantially linear direction 710.

As shown at block 1004a, the method includes controlling the sieve to maintain a stationary position or move the sieve in the fore-aft direction when the lower plate and the upper plate are in the non-engaging position. For example, in the exemplary embodiment shown at FIG. 7A, when the sieve 402 is not moving and when the lower plate 504 and the upper plate 506 are in the non-engaging position, the sieve 402 may be controlled to maintain a stationary position. When the sieve 402 is in the fore-aft direction 514 and when the lower plate 504 and the upper plate 506 are in the non-engaging position, the sieve 402 may be controlled to move in the fore-aft direction 514.

As shown at block 1004b, the method includes controlling the sieve to move diagonal to the fore-aft direction in a first engaging substantially linear direction of the upper plate motion when the lower plate and the upper plate are in the first engaging position. For example, in the exemplary embodiment shown at FIG. 7B, when the lower plate 504 and the upper plate 506 are in the first engaging position, the sieve 402 may be controlled to move diagonal to the fore-aft direction 514 in a first engaging substantially linear direction 704 of the upper plate motion.

As shown at block 1004c, the method includes controlling the sieve to move diagonal to the fore-aft direction in a second engaging substantially linear direction of the upper plate motion when the lower plate and the upper plate are in the second engaging position. For example, in the exemplary embodiment shown at FIG. 7C, when the lower plate 504 and the upper plate 506 are in the second engaging position, the sieve 402 may be controlled to move diagonal to the fore-aft direction 514 in a second engaging substantially linear direction 710 of the upper plate motion.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A combine side-shaking control system, comprising:
(I) a sieve for separating crop material from other materials and configured to move in a fore-aft direction;
(II) at least one side-shaking assembly comprising:
a mounting device attached to a combine chassis;
a lower plate rotatably coupled to the mounting device and configured to rotate about a lower plate axis;
an upper plate coupled to the lower plate and configured to (i) have an upper plate rotational motion and rotate responsive to the rotation of the lower plate and (ii) have an upper plate substantially linear motion in a substantially linear direction,
a first pivot arm (i) coupled to the lower plate at a first lower plate pivot portion and (ii) coupled to the upper pivot plate at a first upper plate pivot portion; and
a second pivot arm (i) coupled to the lower plate at a second lower plate pivot portion spaced from the first lower plate pivot portion and (ii) coupled to the upper pivot plate at a second upper plate pivot portion spaced from the first upper plate pivot portion; and
a fixed arm rotatably coupled to the upper plate and attached to the sieve; and (III) an actuation device (i) attached to the combine chassis, (ii) coupled to the lower plate and (iii) configured to rotate the lower plate about the lower plate axis, wherein, responsive to the rotation of the upper plate, the sieve is controlled to move diagonal to the fore-aft direction within a plane including the sieve in the substantially linear direction of the upper plate substantially linear motion.

2. The combine side-shaking control system of claim 1, wherein the sieve is further controlled to move in the substantially linear direction of the upper plate substantially linear motion which is substantially perpendicular to the first pivot arm and the second pivot arm.

3. The combine side-shaking control system of claim 1, wherein the lower plate and the upper plate are configured to rotate between a non-engaging position and at least one engaging position;

the upper plate is configured to (i) have a non-engaging motion in a non-engaging substantially linear direction and (ii) have an engaging motion in an engaging substantially linear direction different from the non-engaging substantially linear direction;

the sieve is controlled to (i) remain stationary or move in the fore-aft direction when the lower plate and the upper plate are in the non-engaging position, and (ii) move diagonal to the fore-aft direction in the engaging substantially linear direction of the upper plate substantially linear motion when the lower plate and the upper plate are in the at least one engaging position.

4. The combine side-shaking control system of claim 3, wherein the at least one engaging position further comprises a first engaging position and a second engaging position;

the lower plate and the upper plate are further configured to (i) rotate to the first engaging position and (ii) rotate to the second engaging position;

the upper plate is configured to (i) have a first engaging motion in a first engaging substantially linear direction and (ii) have an second engaging motion in a second engaging substantially linear direction different from the first engaging substantially linear direction; and the sieve is controlled to (i) move diagonal to the fore-aft direction in the first engaging substantially linear direction of the upper plate motion when the lower plate and the upper plate are in the first engaging position and (ii) move diagonal to the fore-aft direction in the second engaging substantially linear direction of the upper plate motion when the lower plate and the upper plate are in the second engaging position.

5. The combine side-shaking control system of claim 1, wherein the actuation device is selected from a group actuation devices comprising an electric actuator, a hydraulic actuator and a pneumatic actuator.

6. The combine side-shaking control system of claim 1, wherein the at least one side-shaking assembly further comprises:

a first side-shaking assembly comprising:
a first mounting device coupled to the combine chassis;
a first lower plate rotatably coupled to the first mounting device and configured to rotate about a first lower plate axis;
a first upper plate coupled to the first lower plate and configured to (i) rotate responsive to the rotation of the first lower plate and (ii) configured to have first upper plate substantially linear motion in the substantially linear direction wherein the first upper plate and first lower plate are pivotally connected by a linkage;
a first fixed arm coupled between the first upper plate and the sieve; and a second side-shaking assembly comprising:
a second mounting device coupled to the combine chassis;
a second lower plate rotatably coupled to the second mounting device and configured to rotate about a second lower plate axis;
a second upper plate coupled to the second lower plate and configured to (i) rotate responsive to the rotation of the second lower plate and (ii) configured to have second upper plate substantially linear motion in the substantially linear direction;
a second fixed arm coupled between the second upper plate and the sieve.

7. The combine side-shaking control system of claim 6, further comprising a moving device (i) coupled to the first lower plate, the second lower plate and the actuation device and (ii) configured to rotate the first lower plate and the second lower plate, wherein the actuation device is configured to rotate the first lower plate and the second lower plate by moving the moving device.

8. A combine side-shaking control system, comprising:
(I) a sieve for separating crop material from other materials and configured to move in a fore-aft direction;
(II) at least one side-shaking assembly comprising:
a mounting device attached to a combine chassis;
a lower plate rotatably coupled led to the mounting device and configured to rotate about a lower plate axis;
an upper plate coupled to the lower plate and configured to (i) have an upper plate rotational motion and rotate responsive to the rotation of the lower plate and (ii) have an upper plate substantially linear motion in a substantially linear direction; and
a fixed arm rotatably coupled to the upper plate and attached to the sieve; and
(III) an actuation device (i) attached to the combine chassis, (ii) coupled to the lower plate and (iii) configured to rotate the lower plate about the lower plate axis,
wherein, responsive to the rotation of the upper plate, the sieve is controlled to move diagonal to the fore-aft direction in the substantially linear direction of the upper plate substantially linear motion; and
a first pivot arm (i) coupled to the lower plate at a first lower plate pivot portion and (ii) coupled to the upper pivot plate at a first upper plate pivot portion; and
a second pivot arm (i) coupled to the lower plate at a second lower plate pivot portion spaced from the first lower plate pivot portion and (ii) coupled to the upper pivot plate at a second upper plate pivot portion spaced from the first upper plate pivot portion,
wherein the sieve is further controlled to move in the substantially linear direction of the upper plate substantially linear motion which is substantially parallel to a line extending between the first upper plate pivot portion and the second upper plate pivot portion.

9. A combine comprising:
a sieve for separating crop material from other materials and configured to move in a fore-aft direction;
at least one side-shaking assembly comprising:
a mounting device attached to a combine chassis;
a first plate rotatably coupled to the mounting device and configured to rotate about a first plate axis;

a second plate coupled to the first plate and configured to (i) have a second plate rotational motion and rotate responsive to the rotation of the first plate and (ii) have a second plate substantially linear motion in a substantially linear direction; and
a first pivot arm pivotally connected the first and second plate; and
a second pivot arm pivotally connected the first and second plate wherein the connections of the first pivot arms to the first and second pivot plates are spaced from the connections of the second pivot arm to the first and second pivot plates,
a fixed arm rotatable coupled to the second plate and attached to the sieve; and
an actuation device (i) attached to the combine chassis, (ii) coupled to the lower first plate and (iii) configured to rotate the first plate about the first plate axis; and
a controller configured to control the actuation device to control the assembly to control the sieve to (i) move in the fore-aft direction or (ii) move diagonal to the fore-aft direction in the substantially linear direction of the substantially linear second plate motion.

10. The combine of claim 9, wherein
the first plate and the second plate are configured to rotate between a non-engaging position and at least one engaging position;
the second plate is configured to (i) have a non-engaging motion in a non-engaging substantially linear direction and (ii) have an engaging motion in an engaging substantially linear direction different from the non-engaging substantially linear direction;
the sieve is controlled to (i) remain stationary or move in the fore-aft direction when the first plate and the second plate are in the non-engaging position, and (ii) move diagonal to the fore-aft direction in the engaging substantially linear direction of the second plate motion when the first plate and the second plate are in the at least one engaging position.

11. The combine of claim 9, wherein the actuation device is selected from a group actuation devices comprising an electric actuator, a hydraulic actuator and a pneumatic actuator.

12. The combine of claim 9, further comprising:
a first side-shaking assembly comprising:
a first mounting device coupled to the combine chassis,
a first lower plate rotatably coupled to the first mounting device and configured to rotate about a first lower plate axis,
a first upper plate coupled to the first lower plate and configured to (i) rotate responsive to the rotation of the first lower plate and (ii) configured to have first upper plate substantially linear motion in the substantially linear direction,
a first fixed arm coupled between the first upper plate and the sieve; and
a second side-shaking assembly
a second mounting device coupled to the combine chassis,
a second lower plate rotatably coupled to the second mounting device and configured to rotate about a second lower plate axis,
a second upper plate coupled to the second lower plate and configured to (i) rotate responsive to the rotation of the second lower plate and (ii) configured to have second upper plate substantially linear motion in the substantially linear direction of the first upper plate motion, and
a second fixed arm coupled between the second upper plate and the sieve.

13. The combine of claim 11, further comprising a moving device (i) coupled to the first lower plate, the second lower plate and the actuation device and (ii) configured to rotate the first lower plate and the second lower plate,
wherein the controller is further configured to control the sieve to (i) move in the fore-aft direction or (ii) move diagonal to the fore-aft direction in the substantially linear direction of the first upper plate substantially linear motion and the second upper plate motion by controlling the actuation device to move the moving device which rotates the first lower plate and the second lower plate.

14. A combine comprising:
a sieve for separating crop material from other materials and configured to move in a fore-aft direction;
at least one side-shaking assembly comprising:
a mounting device attached to a combine chassis;
a lower plate rotatably coupled to the mounting device and configured to rotate about a lower plate axis;
an upper plate coupled to the lower plate and configured to (i) have an upper plate rotational motion and rotate responsive to the rotation of the lower plate and (ii) have an upper plate substantially linear motion in a substantially linear direction; and
a fixed arm rotatable coupled to the upper plate and attached to the sieve; and
an actuation device (i) attached to the combine chassis, (ii) coupled to the lower plate and (iii) configured to rotate the lower plate about the lower plate axis; and
a controller configured to control the actuation device and side shake assembly to control the sieve to (i) move in the fore-aft direction or (ii) move diagonal to the fore-aft direction in the substantially linear direction of the substantially linear upper plate motion; and
a first pivot arm (i) coupled to the lower plate at a first lower plate pivot portion and (ii) coupled to the upper pivot plate at a first upper plate pivot portion; and
a second pivot arm (i) coupled to the lower plate at a second lower plate pivot portion spaced from the first lower plate pivot portion and (ii) coupled to the upper pivot plate at a second upper plate pivot portion spaced from the first upper plate pivot portion,
wherein the sieve is further controlled to move in the substantially linear direction of the upper plate substantially linear motion which is substantially parallel to a line extending between the first upper plate pivot portion and the second upper plate pivot portion.

15. A combine comprising:
a sieve for separating crop material from other materials and configured to move in a fore-aft direction;
at least one side-shaking assembly comprising:
a mounting device attached to a combine chassis;
a lower plate rotatably device and configured to rotate about a lower plate axis;
an upper plate coupled to the lower plate and configured to (i) have an upper plate rotational motion and rotate responsive to the rotation of the lower plate and (ii) have an upper plate substantially linear motion in a substantially linear direction; and
a fixed arm rotatable coupled to the upper plate and attached to the sieve; and
an actuation device (i) attached to the combine chassis, (ii) coupled to the lower plate and (iii) configured to rotate the lower plate about the lower plate axis; and a controller configured to control the actuation device and side shake assembly to control the sieve to (i) move in the fore-aft direction or (ii) move diagonal to the fore-aft direction in the substantially linear direction of the substantially linear upper plate motion; and a first pivot arm (i) coupled to the lower plate at a first lower plate pivot portion and (ii) coupled to the upper pivot plate at a first upper plate pivot portion; and a second pivot arm (i) coupled to the lower plate at a second lower plate pivot portion spaced from the first lower plate pivot portion, (ii) coupled to the upper pivot plate at a second upper plate pivot portion spaced from the first upper plate pivot portion, and (iii) substantially parallel to the first pivot arm, wherein the sieve is further controlled to move in the substantially linear direction of the upper plate substantially linear motion which is substantially perpendicular to the first pivot arm and the second pivot arm.

\* \* \* \* \*